US012455404B2

(12) United States Patent
Cranton et al.

(10) Patent No.: US 12,455,404 B2
(45) Date of Patent: Oct. 28, 2025

(54) MULTI-FOCAL OPTICS FOR WEARABLE HEADS-UP DISPLAYS

(71) Applicant: GOOGLE LLC, Mountain View, CA (US)

(72) Inventors: Brian Watson Cranton, Kitchener (CA); Darren Edward Ihmels, Stratford (CA); Ian Andrews, Kitchener (CA); Lloyd Frederick Holland, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 603 days.

(21) Appl. No.: 17/205,410

(22) Filed: Mar. 18, 2021

(65) Prior Publication Data

US 2022/0268970 A1 Aug. 25, 2022

Related U.S. Application Data

(60) Provisional application No. 62/991,133, filed on Mar. 18, 2020.

(51) Int. Cl.
*G02B 3/10* (2006.01)
*G02B 3/00* (2006.01)
*G02B 27/01* (2006.01)

(52) U.S. Cl.
CPC ............. *G02B 3/10* (2013.01); *G02B 3/0081* (2013.01); *G02B 27/0172* (2013.01); *G02B 2003/0093* (2013.01); *G02B 2027/011* (2013.01); *G02B 2027/0123* (2013.01); *G02B 2027/0178* (2013.01)

(58) Field of Classification Search
CPC .... G02B 3/10; G02B 3/0081; G02B 27/0172; G02B 2003/0093; G02B 2027/011; G02B 2027/0123; G02B 2027/0178; G02B 27/0081
See application file for complete search history.

(56) References Cited

U.S. PATENT DOCUMENTS

| 4,472,036 A * | 9/1984 | Kitani | G02C 7/061 |
| | | | 351/159.42 |
| 2012/0147317 A1* | 6/2012 | Loeb, Jr. | G02C 7/06 |
| | | | 351/159.43 |

FOREIGN PATENT DOCUMENTS

| EP | 2198769 A1 * | 6/2010 | ........ G01M 11/0257 |
| WO | WO-2015097169 A1 * | 7/2015 | ......... G02B 27/0172 |
| WO | WO-2016185405 A1 * | 11/2016 | ............... A61F 9/02 |

OTHER PUBLICATIONS

Cholewiak et al, "A Perceptual Eyebox for Near-eye displays", 2020, Opt. Express 28, Abstract (Year: 2020).*

* cited by examiner

*Primary Examiner* — Bumsuk Won
*Assistant Examiner* — Ray Alexander Dean

(57) ABSTRACT

Systems, devices, and assemblies for implementing multi-focal lens portions in wearable heads-up displays are described. Multi-focal lens portions may include at least two regions having different optical power, and at least one transition region between regions having different optical power. If display light is directed through a transition region, aberrations or distortion may be visible in the display presented to the user. The present systems, devices, and assemblies address this issue through shaping, positioning, and orienting of regions of a multi-focal lens portion, through positioning, orientation, and aiming of display optics, and/or through arrangements of lens assemblies which prevent display light from travelling through a multi-focal lens portion.

30 Claims, 21 Drawing Sheets

MULTI-FOCAL OPTICS FOR WEARABLE HEADS-UP DISPLAYS

CROSS-REFERENCE TO RELATED APPLICATIONS

The present application claims priority to U.S. Provisional Patent Application Ser. No. 62/991,133, entitled "Multi-Focal Optics for Wearable Heads-Up Displays" and filed on Mar. 18, 2020, the entirety of which is incorporated by reference herein.

BACKGROUND

The use of wearable display devices, such as smartglasses, continues to increase at a rapid pace. For example, wearable display devices have increasingly become an important part of the way in which users interact with different applications. The wearable display devices are worn on a user's head and, when so worn, secures at least one electronic display within a viewable field of at least one of the user's eyes. These wearable display devices are configured with a single focal lens (e.g., one monocular wearable display device) or at least two focal lenses, one for each eye (e.g., binocular wearable display device). Additionally, the focal lens for these wearable display devices can be configured to have at least one or more different optical powers, and thereby the focal lens may correspond to different formats, such as bifocals, trifocals, progressives, regressive, among other examples. Other electronic components may also be operably configured with the wearable display devices to support various operations.

SUMMARY

According to a broad aspect, the present disclosure describes a wearable heads-up display comprising: a support structure to be worn on a head of a user; a light engine carried by the support structure, the light engine to output display light; a lens carried by the support structure, the lens including a first region having a first optical power, a second region having a second optical power different from the first optical power, and a first transition region between the first region and the second region, wherein an optical power of the first transition region transitions between the first optical power and the second optical power over the first transition region; and an optical redirector positioned and oriented to receive display light from the light engine and redirect display light towards an eye of the user through a region of the lens outside of the first transition region.

The first transition region may be shaped to be outside of an area of the lens through which display light passes.

The optical redirector may be positioned and oriented to redirect display light from the light engine through one of the first region of the lens or the second region of the lens. The second region of the lens may be positioned near a bottom of the lens. The lens may comprise a bifocal lens, the second optical power may provide optical power add compared to the first optical power, and the first transition region may be a boundary between the first region and the second region.

The lens may comprise a trifocal lens which further includes a third region having a third optical power and a second transition region between the first region and the third region, wherein an optical power of the second transition region transitions between the first optical power and the third optical power over the second transition region, and the optical redirector may be positioned and oriented to redirect display light from the light engine through one of the first region of the lens, the second region of the lens, or the third region of the lens.

The lens may be a varifocal lens and the first transition region may include: a corridor between the first region and the second region, the corridor having an optical power ranging between the first optical power at the first region and the second optical power at the second region; a first blending region adjacent the first region, the second region, and the corridor; and a second blending region adjacent the first region, the second region, and the corridor opposite the first blending region, wherein the optical redirector is positioned and oriented to redirect display light from the light engine towards the eye of the user through a region of the lens outside of the corridor, the first blending region, and the second blending region. The optical redirector may be positioned and oriented to redirect display light from the light engine through the first region of the lens. The optical redirector may be positioned and oriented to redirect display light from the light engine through the second region of the lens. The second optical power may provide optical power add compared to the first optical power. The first blending region, the second blending region, and the corridor may be shaped to be outside of an area of the lens through which display light passes.

The second region of the lens may be positioned along an axis that extends from the eye of the user to a desired position of the display in a field of view of the user, and the optical redirector may be positioned and oriented to redirect display light from the light engine through the second region of the lens.

The lens may comprise an eye-side lens portion and a world-side lens portion, and the optical redirector may be sandwiched in between the eye-side lens portion and the world-side lens portion. The optical redirector may comprise a light guide, the light guide including an incoupler to receive display light from the light engine and redirect the display light to travel within a volume of the light guide, the light guide further including an outcoupler to receive display light travelling in the volume of the light guide and redirect the display light traveling in the volume of the light guide to exit the volume of the light guide towards the eye-side lens portion. The first region and the second region may be regions of the eye-side lens portion. The world-side lens portion may include a third region positioned along an axis that extends from the eye of the user, through the second region, to a desired position of the display in a field of view of the user; the world-side lens portion may include a fourth region outside of the third region; and a difference between an optical power of the third region and an optical power of the fourth region may be compensate for a difference between the first optical power and the second optical power.

According to another broad aspect, the present disclosure describes a lens assembly comprising: a first lens portion, the first lens portion including a first region having a first optical power, a second region having a second optical power different from the first optical power, and a transition region between the first region and the second region, wherein an optical power of the transition region transitions between the first optical power and the second optical power over the transition region; a second lens portion; and a light guide positioned between the first lens portion and the second lens portion, the light guide having an output eyebox positioned outside of the transition region.

The transition region may be shaped to be outside of the output eyebox of the light guide.

The light guide has an output eyebox that passes through one of the first region of the first lens portion or the second region of the first lens portion. The second optical power may provide an optical power add compared to the first optical power, and the transition region may be a boundary between the first region and the second region.

The first lens portion may be a varifocal lens and the transition region may be a corridor between the first region and the second region, the corridor having an optical power ranging between the first optical power at the first region and the second optical power at the second region, the first lens portion may further comprise: a first blending region adjacent the first region, the second region, and the corridor; and a second blending region adjacent the first region, the second region, and the corridor opposite the first blending region, wherein the output eyebox of the light guide is positioned outside of the corridor, the first blending region, and the second blending region. The output eyebox of the light guide may pass through one of the first region or the second region of the first lens portion. The second optical power may provide an optical power add compared to the first optical power. The first blending region, the second blending region, and the corridor may be shaped to be outside of the output eyebox of the light guide.

The second lens portion may include a third region; the second lens portion may include a fourth region outside of the third region and having a different optical power from the third region; a difference between an optical power of the third region and an optical power of the fourth region may compensate for a difference between the first optical power and the second optical power; and the second region of the first lens portion, the third region of the second lens portion, and the output eyebox of the light guide may be aligned on an axis.

The light guide may include an incoupler to receive display light from a light engine and redirect the display light to travel within a volume of the light guide, the light guide may further include an outcoupler to receive display light travelling in the volume of the light guide and redirect the display light traveling in the volume of the light guide to exit the volume of the light guide.

According to another broad aspect, the present disclosure describes a wearable heads up display comprising: a support structure to be worn on a head of a user; a light engine carried by the support structure, the light engine to output display light; a first lens portion carried by the support structure, the first lens portion including a first region having a first optical power, a second region having a second optical power different from the first optical power, and a transition region between the first region and the second region, wherein an optical power of the transition region transitions between the first optical power and the second optical power over the transition region; and an optical redirector positioned and oriented to receive display light from the light engine and redirect display light through the second region of the first lens.

The wearable heads-up display may further comprise a second lens portion carried by the support structure and positioned opposite the optical redirector relative to the first lens portion, the second lens portion having a third region having a third optical power and a fourth region having a fourth optical power, wherein a difference between the third optical power and the fourth optical power compensates for a difference between the first optical power and the second optical power. The third region may be positioned on an axis that extends from an eye of the user through the second region. The optical redirector may comprise a light guide, the light guide including an incoupler to receive display light from the light engine and redirect the display light to travel within a volume of the light guide, the light guide further including an outcoupler to receive display light travelling in the volume of the light guide and redirect the display light traveling in the volume of the light guide to exit the volume of the light guide towards the first lens portion.

According to another broad aspect, the present disclosure describes a wearable heads-up display comprising: a support structure to be worn on a head of a user; a light engine carried by the support structure, the light engine to output display light; an eye-side lens portion carried by the support structure to be positioned proximal to an eye of the user when the support structure is worn on the head of the user; a world-side lens portion carried by the support structure to be positioned distal from the eye of the user when the support structure is worn on the head of the user, the world-side lens portion including a first region having a first optical power, a second region having a second optical power different from the first optical power, and a transition region between the first region and the second region, wherein an optical power of the transition region transitions between the first optical power and the second optical power over the transition region; and an optical redirector positioned between the eye-side lens portion and the world-side lens portion, the optical redirector to receive display light from the light engine and redirect display light towards the eye of the user through the eye-side lens portion when the support structure is worn on the head of the user.

The optical redirector may comprise a light guide, the light guide including an incoupler to receive display light from the light engine and redirect the display light to travel within a volume of the light guide, the light guide further including an outcoupler to receive display light travelling in the volume of the light guide and redirect the display light traveling in the volume of the light guide to exit the volume of the light guide towards the eye-side lens portion.

The eye-side lens portion may have no optical power. The eye-side lens portion may have optical power. The first optical power may be zero. The second optical power may be non-zero. The eye-side lens portion may have a uniform non-zero optical power, the first optical power may be zero, and the second optical power may be non-zero.

The first region, the second region, and the transition region may be positioned on a world-side surface of the world-side lens portion. The first region, the second region, and the transition region may be positioned on an eye-side surface of the world-side lens portion.

According to another broad aspect, the present disclosure describes a lens assembly comprising: a first lens portion; a second lens portion, the second lens portion including a first region having a first optical power, a second region having a second optical power different from the first optical power, and a transition region between the first region and the second region, wherein an optical power of the transition region transitions between the first optical power and the second optical power over the transition region; and a light guide positioned between the first lens portion and the second lens portion, the light guide having an output eyebox oriented towards the first lens portion.

The first lens portion may have no optical power. The first lens portion may have optical power. The first optical power may be zero. The second optical power may be non-zero. The first lens may have a uniform non-zero optical power, the first optical power may be zero, and the second optical power may be non-zero.

The first region, the second region, and the transition region may be positioned on a surface of the second lens portion which is distal from the first lens portion. The first region, the second region, and the transition region may be positioned on a surface of the second lens portion which is proximal to the first lens portion.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
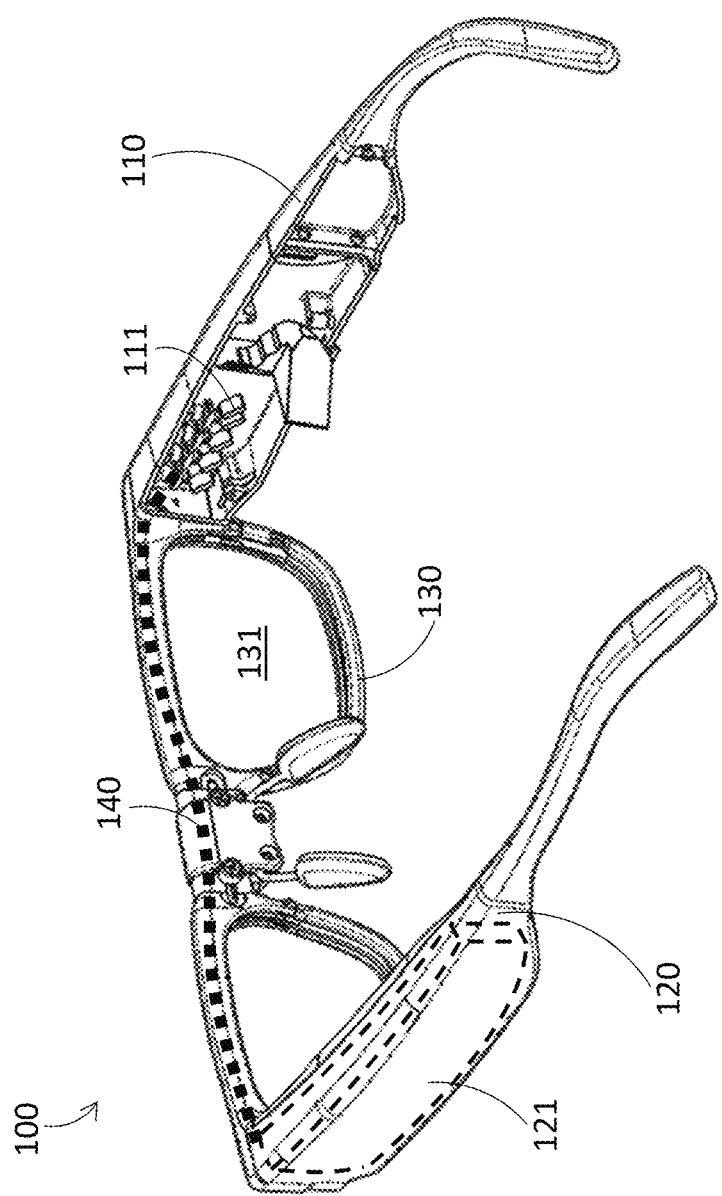
FIGS. 1 through 4 illustrate diagrams of wearable display devices in accordance with some embodiments.

FIG. 1 illustrates a diagram of a wearable display device 100 in accordance with some embodiments. The wearable display device 100 includes a support structure which includes a first arm 110, a second arm 120, and a front frame 130, which is physically coupled to the first arm 110 and the second arm 120. When worn by a user, the first arm 110 may be positioned on a first side of a head of the user, while the second arm 120 may be positioned on a second side of the head of the user opposite to the first side of the head of the user, and the front frame 130 may be positioned on a front side of the head of the user. The first arm 110 carries a light engine 111 which outputs light representative of display content (alternatively referred to as display light) to be viewed by a user. The first arm 110 may also optionally carry several additional components of the wearable display device 100, such as a processor, a non-transitory processor-readable storage medium, or a power supply circuit, among other examples. The front frame 130 carries an optical redirector 131, in a field-of-view of the user, which receives light output from the light engine 111 and redirects this light to form a display to be viewed by the user.

In the example of FIG. 1, the display may be a monocular display visible to a right eye of the user. The second arm 120 as shown in FIG. 1 carries a power source 121, which powers the components of the wearable display device 100. The front frame 130 carries a set of electrically conductive current paths 140, which provide electrical coupling between the power source 121 and the light engine 111, and any other electrical components carried by the first arm 110. The term power source as used herein can refer to a component which provides electrical power, which may include a source of stored power such as a battery (e.g., a chemical battery, a mechanical battery), or a power generation system, such as piezoelectric elements, solar cells, or similar. A set of electrically conductive current paths as used herein can refer to a single electrically conductive current path, such as a wire or conductive trace on a printed circuit board, as well as a plurality of electrically conductive current paths, such as a plurality of wires or a plurality of conductive traces on a printed circuit board.

Figure 3:
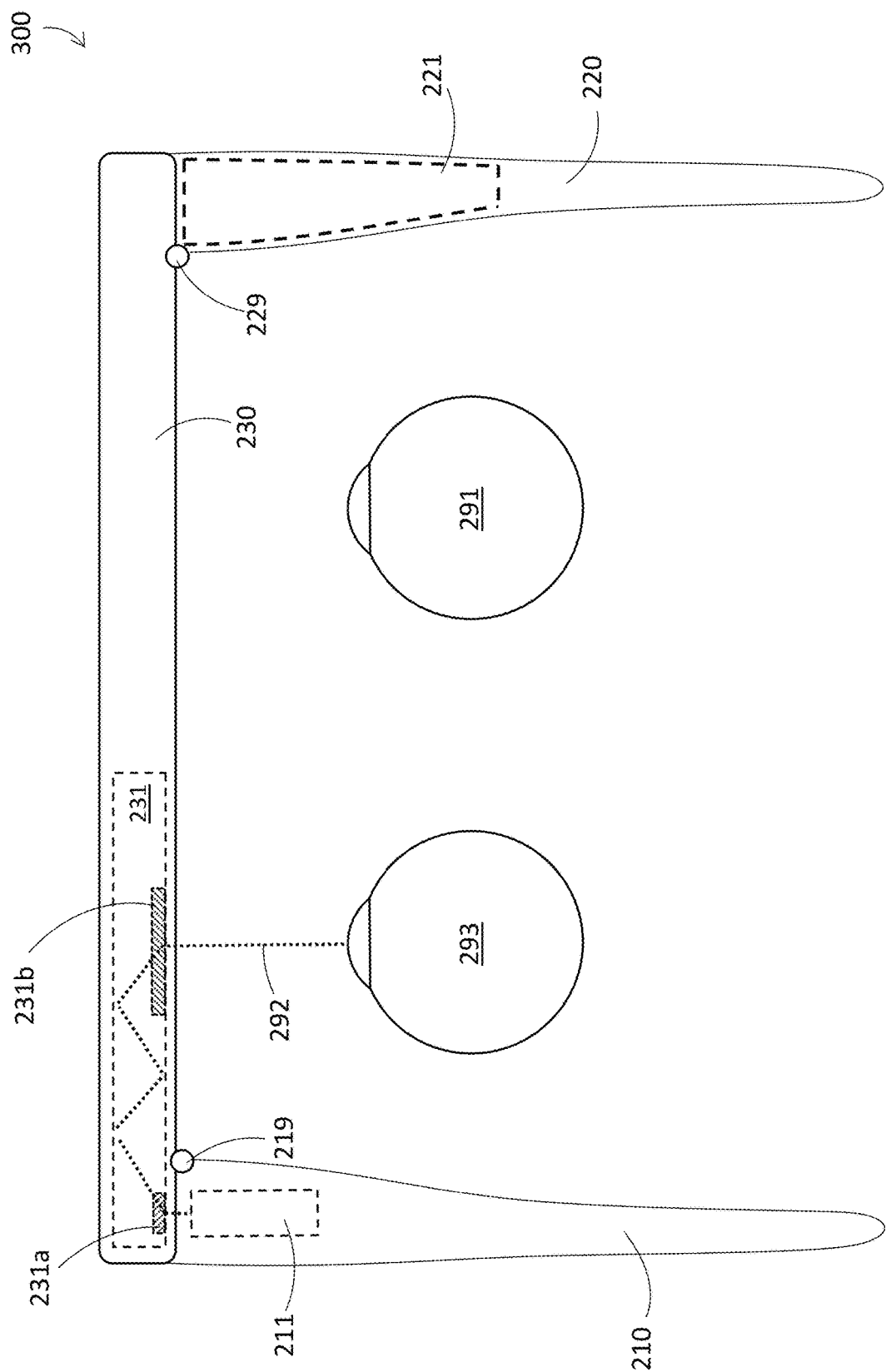

In some embodiments, the orientation of the wearable display device 100 could be reversed, such that the display is presented to a left eye of a user instead of the right eye, as further illustrated in FIG. 3. The second arm 120 could carry a light engine similar to the light engine 111 carried by the first arm 110, and the front frame 130 could also carry another optical redirector similar to the optical redirector 131, such that wearable display device 100 presents a binocular display to both a right eye and a left eye of a user, as further illustrated in FIG. 4.

The light engine 111 and the optical redirector 131 can include any appropriate display architecture for outputting light and redirecting the light to form a display to be viewed by a user. For example, the light engine 111 and any of the light engines discussed herein, could include a component selected from a group including at least: one of a projector, a scanning laser projector, a micro-display, a white-light source, or any other display technology as appropriate for a given application. The optical redirector 131 and any of the optical redirectors discussed herein could include an optical component selected from a group including at least: a light guide, at least one holographic optical element, at least one prism, a diffraction grating, at least one light reflector, a light reflector array, at least one light refractor, a light refractor array, or any other light-redirection technology as appropriate for a given application, positioned and oriented to redirect the display light towards the eye of the user.

The optical redirector 131 can be carried by a transparent carrier or a transparent carrier assembly, and the transparent carrier or transparent carrier assembly can be carried by the front frame 130. For example, the optical redirector 131 may be a layer formed as part of a transparent carrier, a layer adhered to a transparent carrier, a layer embedded within a transparent carrier, a layer sandwiched between at least two transparent carriers of a transparent carrier assembly, integrally formed with a transparent carrier or any other appropriate arrangement. A layer can for example be molded or cast, or may include a thin film or coating. A transparent carrier as described herein may refer to a material which acts to carry or support an optical redirector. As one example, a transparent carrier may be an eyeglasses lens or lens assembly, such as those described with reference to FIGS. 5 through 9. As another example, optical redirectors herein may be carried external to a lens or lens assembly, such as in the example described with reference to FIG. 10.

Exemplary display architectures could include for example scanning laser projector and holographic optical element combinations, side-illuminated optical light guide displays, pin-light displays, or any other wearable heads-up display technology as appropriate for a given application. Exemplary display architectures are described in at least U.S. Provisional Patent Application No. 62/754,339, U.S. Provisional Patent Application Ser. No. 62/782,918, U.S. Provisional Patent Application Ser. No. 62/789,908, U.S.

Provisional Patent Application Ser. No. 62/845,956, and U.S. Provisional Patent Application Ser. No. 62/791,514. The term light engine as used herein is not limited to referring to a singular light source, but can also refer to a plurality of light sources, and can also refer to a light engine assembly. A light engine assembly may include some components which enable the light engine to function, or which improve operation of the light engine. As one example, a light engine may include a light source, such as a laser or a plurality of lasers. The light engine assembly may additionally include electrical components, such as driver circuitry to power the at least one light source. The light engine assembly may additionally include optical components, such as collimation lenses, a beam combiner, or beam shaping optics. The light engine assembly may additionally include beam redirection optics, such as least one MEMS mirror, which can be operated to scan light from at least one laser light source, such as in a scanning laser projector. In the above example, the light engine assembly includes a light source and also components, which take the output from at least one light source and produce conditioned display light. All of the components in the light engine assembly may be included in a housing of the light engine assembly, affixed to a substrate of the light engine assembly, such as a printed circuit board or similar, or separately mounted components of a WHUD. Some exemplary light engine assemblies are discussed in U.S. Provisional Patent Application No. 62/916,297 the wearable display device 100.

Figure 2:
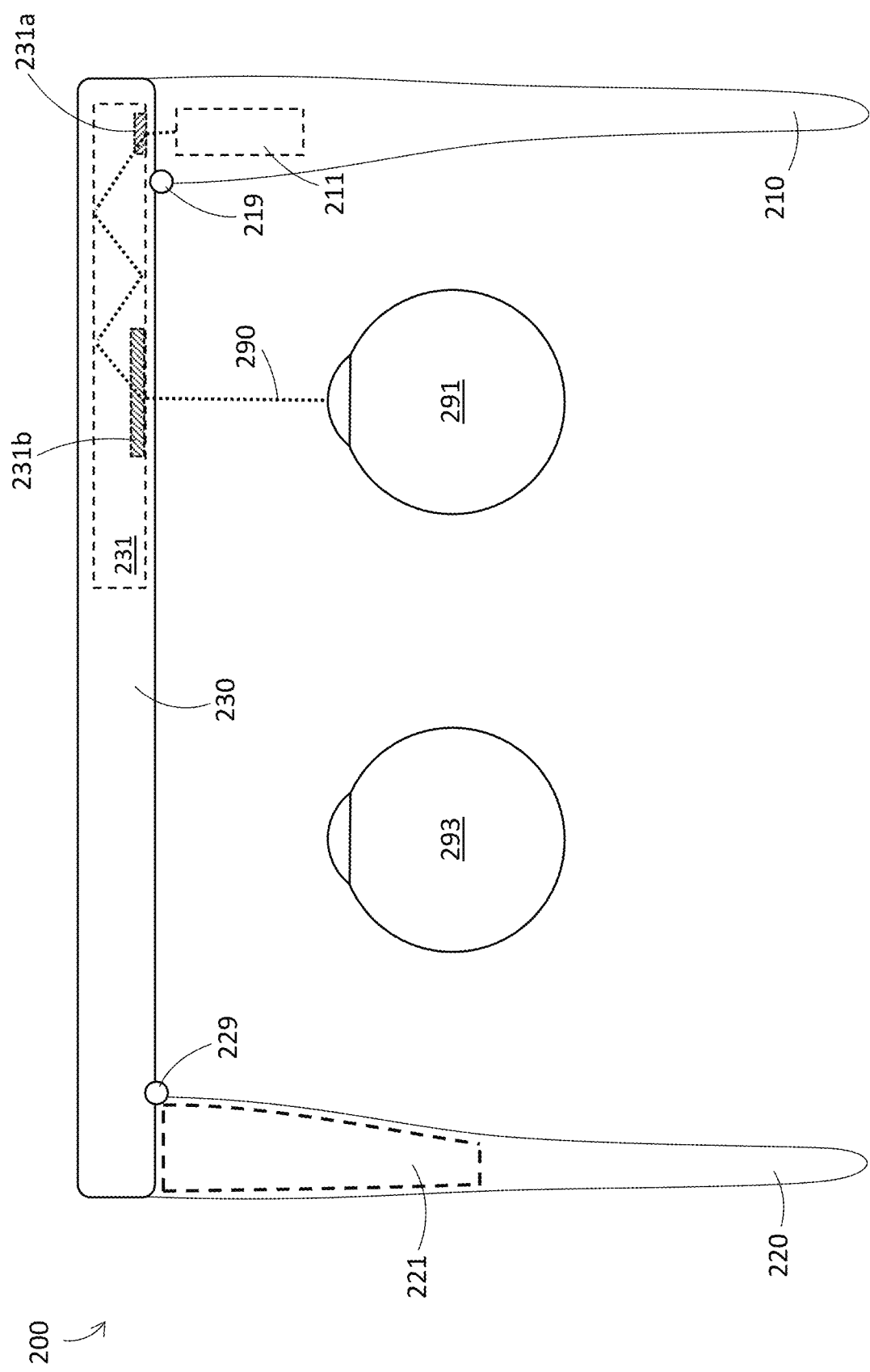

FIG. 2 illustrates a diagram of a wearable display device 200 in accordance with some embodiments. In some embodiments, the wearable display device 200 may implement or be implemented by aspects of the wearable display device 100. For example, the wearable display device 200 may include a first arm 210, a second arm 220, and a front frame 230. The first arm 210 may be coupled to the front frame 230 by a hinge 219, which allows the first arm 210 to rotate relative to the front frame 230. The second arm 220 may be coupled to the front frame 230 by the hinge 229, which allows the second arm 220 to rotate relative to the front frame 230.

In the example of FIG. 2, the wearable display device 200 may be in an unfolded configuration, in which the first arm 210 and the second arm 220 are rotated such that the wearable display device 200 can be worn on a head of a user, with the first arm 210 positioned on a first side of the head of the user, the second arm 220 positioned on a second side of the head of the user opposite the first side, and the front frame 230 positioned on a front of the head of the user. The first arm 210 and the second arm 220 can be rotated towards the front frame 230, until both the first arm 210 and the second arm 220 are approximately parallel to the front frame 230, such that the wearable display device 200 may be in a compact shape that fits conveniently in a rectangular, cylindrical, or oblong case. Alternatively, the first arm 210 and the second arm 220 may be fixedly mounted to the front frame 230, such that the wearable display device 200 cannot be folded.

In FIG. 2, the first arm 210 carries a light engine 211. The second arm 220 carries a power source 221. The front frame 230 carries an optical redirector 231 and at least one set of electrically conductive current paths. The terms carry, carries or similar used herein do not necessarily dictate that one component physically supports another component. For example, it is stated above that the first arm 210 carries the light engine 211. This could mean that the light engine 211 is mounted to or within the first arm 210, such that the first arm 210 physically supports the light engine 211. However, it could also describe a direct or indirect coupling relationship, even when the first arm 210 is not necessarily physically supporting the light engine 211.

In some embodiments, a hinge of the wearable display device 200 can support both an arm of the wearable display device 200 and a light engine of the wearable display device 200, with no direct supporting relationship between the light engine 211 and the first arm 210. This can be true of any of the component relationships described herein where one component carries another. The at least one set of electrically conductive current paths provide electrical coupling between the power source 221 and electrical components carried by the first arm 210, such as the light engine 211. Such electrical coupling could be provided indirectly, such as through a power supply circuit, or could be provided directly from the power source 221 to each electrical component in the first arm 210.

The light engine 211 can output a display light 290 representative of display content to be viewed by a user. The display light 290 can be redirected by an optical redirector 231 towards an eye 291 of the user, such that the user can see the display content. The optical redirector 231 may be a light guide redirector, which includes an incoupler optic 231$a$ and an outcoupler optic 231$b$. The display light 290 from the light engine 211 impinges on the incoupler optic 231$a$ and is redirected to travel in a volume of the light guide redirector 231, where the display light 290 is guided through the light guide, such as by total internal reflection or light guide surface treatments like holograms or reflective coatings. Subsequently, the display light 290 travelling in the volume of the light guide redirector 231 impinges on the outcoupler optic 231$b$, which redirects the display light 290 out of the light guide redirector and towards the eye 291 of a user. A spatial volume in which an eye can be positioned where a display formed by display light is visible is called an eyebox. An output eyebox of a light guide as used herein refers to a volume through which display light outcoupled from the light guide which forms a display visible to a user passes. An alternative term for "light guide" is "wave guide". Exemplary wave guide and light guide based WHUD display architectures are described in at least U.S. Provisional Patent Application No. 62/754,339, U.S. Provisional Patent Application Ser. No. 62/782,918, U.S. Provisional Patent Ser. No. 62/789,908, Provisional Patent Ser. No. 62/845,956, and U.S. Provisional Patent Application Ser. No. 62/791,514. An alternative term for light guide is wave guide.

The wearable display device 200 may include a processor communicatively coupled to each of the electrical components in the wearable display device 200, including but not limited to the light engine 211. The processor can be any suitable component which can execute instructions or logic, including but not limited to a micro-controller, microprocessor, multi-core processor, integrated-circuit, ASIC, FPGA, programmable logic device, or any appropriate combination of these components. The wearable display device 200 can include a non-transitory processor-readable storage medium, which may store processor readable instructions thereon, which when executed by the processor can cause the processor to execute any number of functions, including causing the light engine 211 to output the light 290 representative of display content to be viewed by a user, receiving user input, managing user interfaces, generating display content to be presented to a user, receiving and managing data from any sensors carried by the wearable display device 200, receiving and processing external data and messages, and any other functions as appropriate for a given application. The non-transitory processor-readable storage medium can be any suitable component, which can store instructions, logic, or programs, including but not limited to non-volatile or volatile memory, read only memory (ROM), random access memory (RAM), FLASH memory, registers, magnetic hard disk, optical disk, or any combination of these components.

FIG. 3 illustrates a diagram of a wearable display device 300 in accordance with some embodiments. In some embodiments, the wearable display device 300 may implement or be implemented by aspects of the wearable display devices 100 and 200. For example, the wearable display device 300 may transition between a folded configuration and an unfolded configuration similarly to the wearable display device 200. The orientation of the components of the wearable display device 300 may be reversed. For example, in the wearable display device 300, the first arm 210 may be positioned on a left side of the head of a user when worn and the second arm 220 may be positioned on a right side of the head of the user when worn. A light engine 211 can output a display light 292, which is redirected by an optical redirector 231 towards a left eye 293 of a user as shown in FIG. 3.

Figure 4:
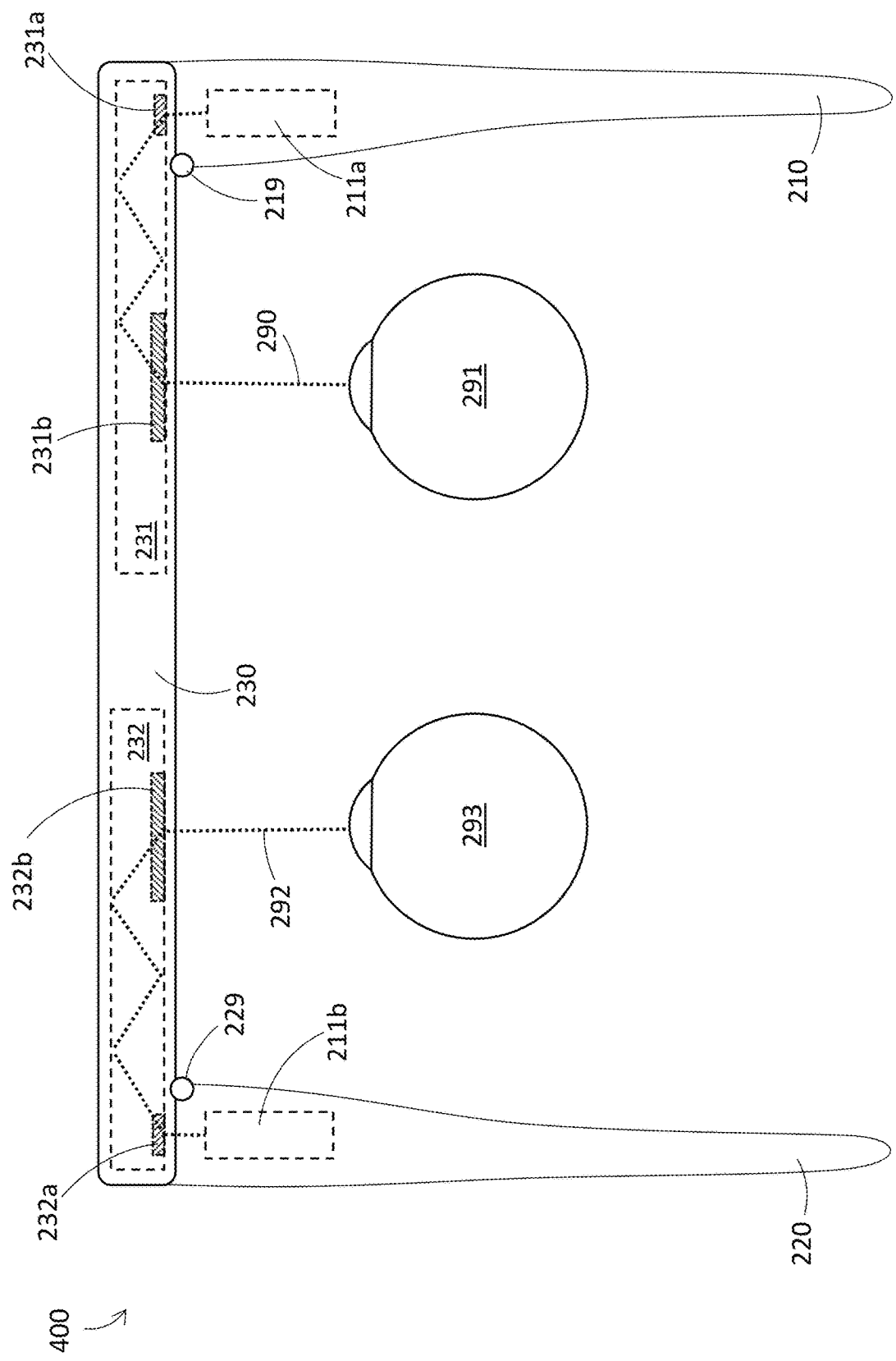

FIG. 4 illustrates a diagram of a wearable display device 400 in accordance with some embodiments. In some embodiments, the wearable display device 400 may implement or be implemented by aspects of the wearable display devices 100, 200, and 300. For example, the wearable display device 400 may transition between a folded configuration and an unfolded configuration similarly to the wearable display devices 100, 200, and 300. The wearable display device 400 may present a display to both an eye 291 and an eye 293 of a user. In some embodiments, the wearable display device 400 may include a first optical redirector 231 in front of the eye 291 of the user, and positioning a second optical redirector 232 in front of the eye 293 of the user. A first light engine 211a carried by a first arm 210 can output a display light 290 to the first optical redirector 231, which can redirect the display light 290 towards the eye 291 of the user to form a display seen by the eye 291. A second light engine 211b carried by a second arm 220 can output a display light 292 to the second optical redirector 232, which can redirect the display light 292 towards the eye 293 of the user to form a display seen by the eye 293.

The optical redirector 231 may include an incoupler optic 231a and outcoupler optic 231b, such that the optical redirector 231 is a light guide redirector which redirects display light towards an eye of the user. The optical redirector 232 may include an incoupler optic 232a and an outcoupler optic 232b as described herein. As such, the optical redirector 232 can be a light guide redirector which redirects display light towards another eye of the user. Optionally, for the wearable display device 400, each of the first arm 210 and the second arm 220 could carry any of a respective processor, a respective non-transitory processor-readable medium, and a respective power supply circuit. In implementations with multiple light engine assemblies or multiple optical redirectors, such as the wearable display device 400 may include a common processor, common non-transitory processor-readable storage medium, and common power supply circuit which are shared by each light engine.

Figure 5:
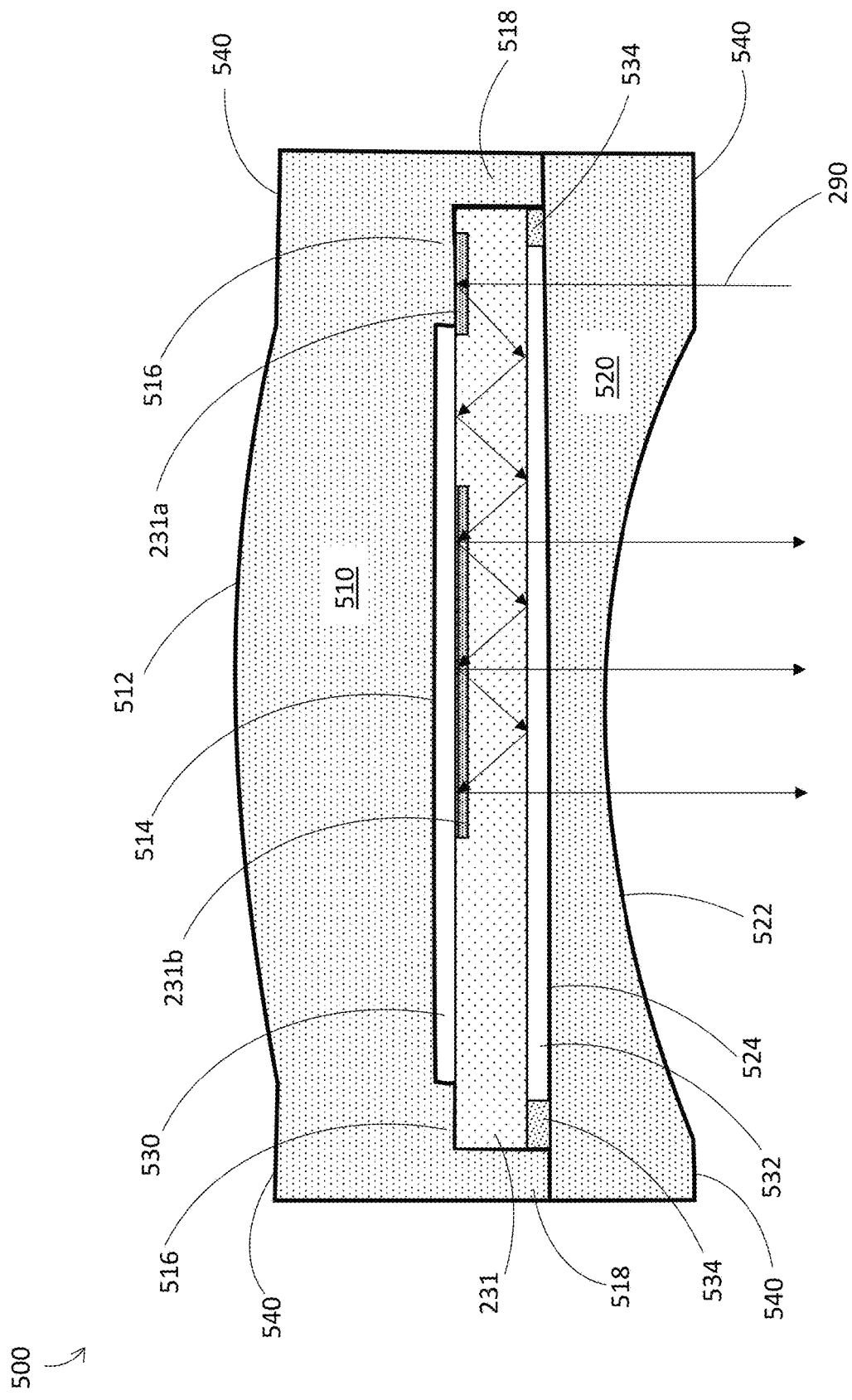
FIGS. 5 through 9 illustrate diagrams of lens assemblies in accordance with some embodiments.

FIG. 5 illustrates a diagram of a lens assembly 500 in accordance with some embodiments. The lens assembly 500 may include a world-side lens portion 510, an eye-side lens portion 520, and an optical redirector 231 positioned between the world-side lens portion 510 and the eye-side lens portion 520. As used herein, the term world-side generally refers to a positioning which is distal from an eye of a user, whereas the term eye-side generally refers to a positioning which is proximal to an eye of the user. An alternative term for eye-side is user-side. In the example of FIG. 5, the world-side lens portion 510 is to be positioned distal from an eye of a user compared to the eye-side lens portion 520. Likewise, the eye-side lens portion 520 is to be positioned proximal to an eye of a user compared to the world-side lens portion 510. The world-side lens portion 510 can include a world-side surface 512 distal to optical redirector 231 (e.g., to be positioned distal to an eye of the user) and an eye-side surface 514 to be positioned proximal to an optical redirector 231 (e.g., to be positioned proximal to an eye of the user). The eye-side lens portion 520 can include an eye-side surface 522 distal to the optical redirector 231 (e.g., to be positioned proximal to an eye of the user) and a world-side surface 524 to be positioned proximal to the optical redirector 231 (e.g., to be positioned distal to an eye of the user).

Once a display light 290 is incoupled into the optical redirector 231, the display light 290 is guided through the optical redirector 231 by total internal reflection. To keep the display light 290 travelling within the optical redirector 231, a gap 530 is maintained between the world-side lens portion 510 and the optical redirector 231, and a gap 532 is maintained between the eye-side lens portion 520 and the optical redirector 231. The gap 530 and the gap 532 can have a lower index of refraction than the material the optical redirector 231 is formed, to maintain total internal reflection within the optical redirector 231. For example, the gap 530 and the gap 532 could be filled with low refractive index material such as air.

To maintain the gap 530, the world-side lens portion 510 can have one or more protrusions 516, which project from the eye-side surface 514 of the world-side lens 510, to abut against peripheral regions of the optical combiner 231. To the maintain gap 532, the eye-side lens portion 520 could have similar protrusions. Alternatively, at least one spacer 534 can be positioned between the eye-side lens portion 520 at a peripheral region of the optical redirector 231. The at least one spacer 534 can be for example a foam, plastic, or otherwise supportive material. The one or more protrusions 516 could be a single protrusion, such as a ring (or partial ring) which encircles at least a partial area of optical redirector. Alternatively, the one or more protrusions 516 could include a plurality of protrusions, such as bumps positioned at different peripheral regions of optical redirector 231.

A spacer 534 could be a single spacer such as a ring or partial ring, or could be a plurality of spacers positioned at different peripheral regions of the optical redirector 231. Alternatively, the at least one spacer 534 could be omitted, and the optical redirector 231 could be affixed to the one or more protrusions 516 of the world-side lens portion 510, such as by adhesive or fasteners. In some embodiments, the optical redirector 231 could be affixed to one or more protrusions of the eye-side lens 520, such as by adhesive or fasteners, and no spacers could be included between the optical redirector 231 and the world-side lens 510.

In the example of FIG. 5, the world-side lens portion 510 has at least one protrusion 518, which extends from the eye-side surface 514 of the world-side lens portion 510 and contacts the world-side surface 524 of the eye-side lens portion 520, to maintain spacing for the optical redirector 231 between the world-side lens portion 510 and the eye-side lens portion 520. Alternatively, the eye-side lens portion 520 could include at least one similar protrusion, which extends from the world-side surface 524 of the eye-side lens portion 520, towards the world-side lens portion 510. Alternatively, spacers similar to the at least one spacer 534 could be included between the world-side lens portion 510 and the eye-side lens portion 520.

The world-side lens portion 510, the eye-side lens portion 520, and the optical redirector 231 could be held in place relative to each other by any appropriate means, such as adhesive or fasteners, or by a friction or compression fit in a front frame of a wearable display device, which carries the lens assembly 500. In the example of FIG. 5, the lens assembly 500 includes one or more plateau regions 540 at peripheral regions of the lens assembly for positioning within or mounting to a front frame of a wearable display device. However, alternative mounting structures could be used such as grooves, protrusions, fasteners, adhesive, or even no mounting structure on the lens assembly 500 at all with a front frame of a wearable display device to encase a peripheral region of the lens assembly 500.

Figure 6:
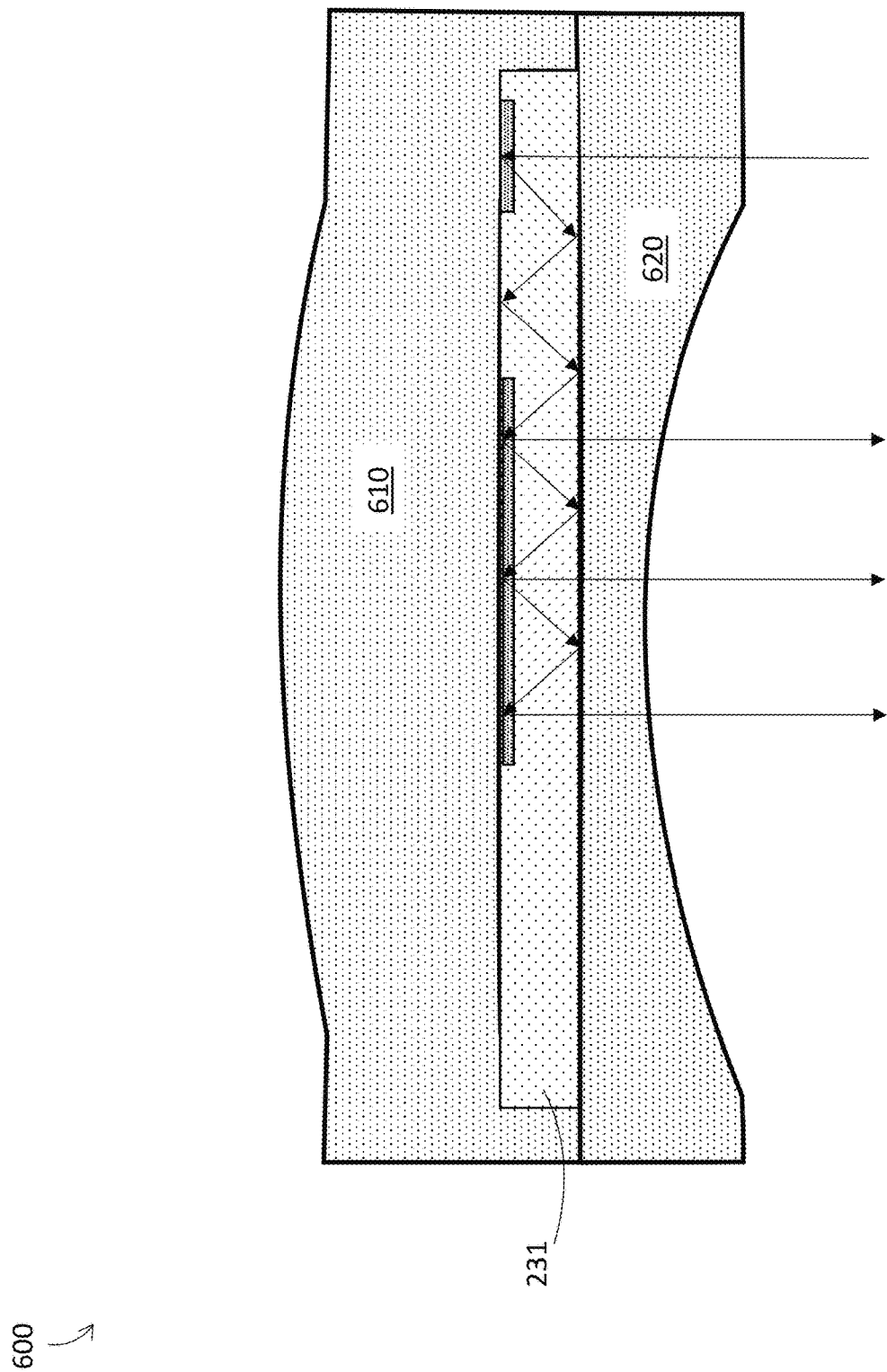

FIG. 6 illustrates a diagram of a lens assembly 600 in accordance with some embodiments. In some embodiments, the lens assembly 600 may implement or be implemented by aspects of the lens assembly 500 as described with reference to FIG. 5. The lens assembly 600 may include an optical redirector 231 positioned between a world-side lens portion 610 and an eye-side lens portion 620 with no gaps therebetween. To maintain total internal reflection of a display light within an optical redirector 231, the world-side lens 610 and the eye-side lens 620 could be formed of a material having lower index of refraction than a material of which the optical redirector 231 is formed. Alternatively, boundaries between the optical redirector 231 and the world-side lens portion 610 and the eye-side lens portion 620 could be treated, such as with reflective coatings or holograms. Such treatment could be in or on the optical redirector 231 itself, or could be in or on the world-side lens portion 610 and the eye-side lens portion 620.

Figure 7:
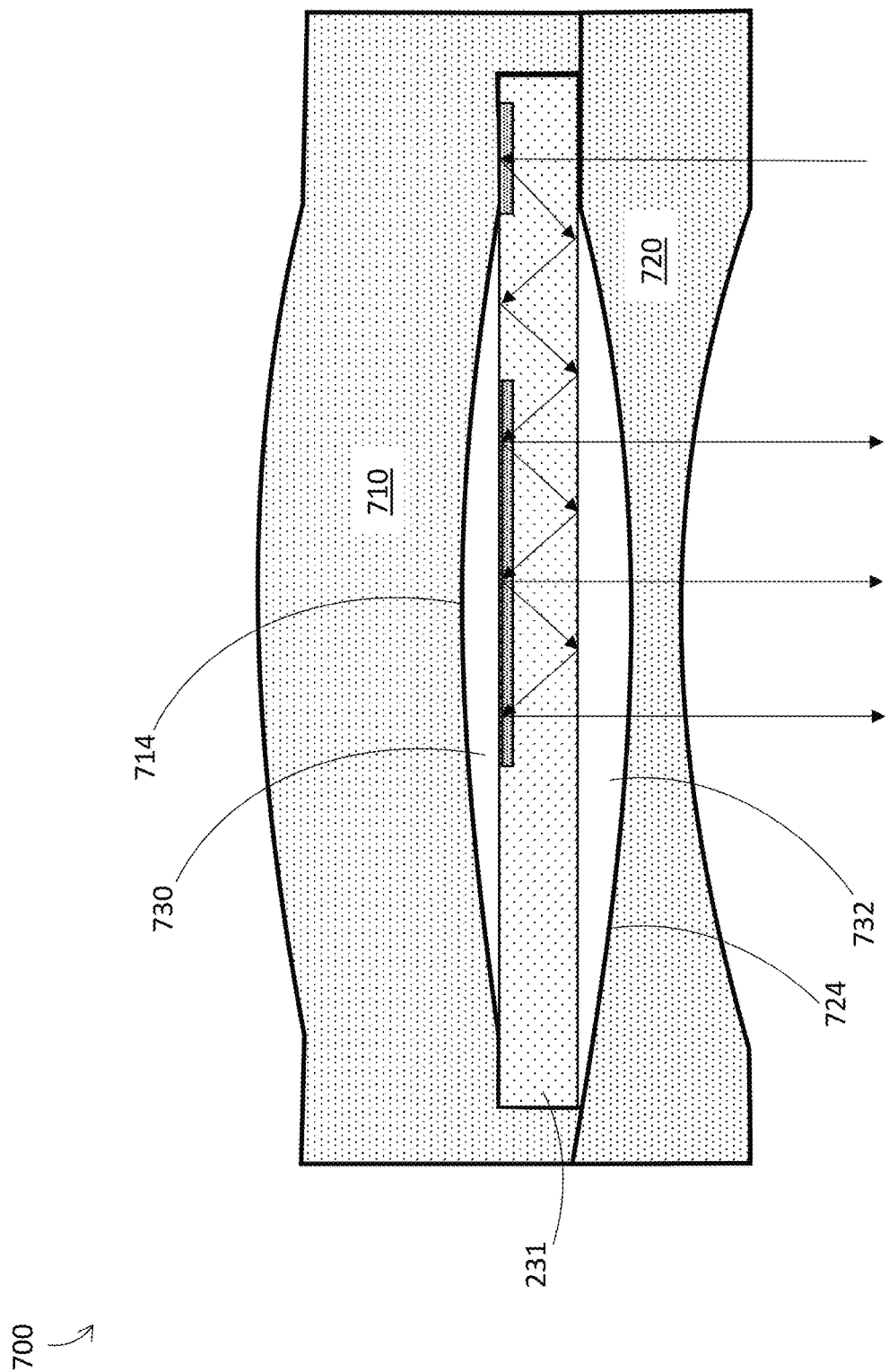

FIG. 7 illustrates a diagram of a lens assembly 700 in accordance with some embodiments. In some embodiments, the lens assembly 700 may implement or be implemented by aspects of the lens assemblies 500 and 600 as described with reference to FIGS. 5 and 6, respectively. The lens assembly 700 may include an eye-side surface 714 of a world-side lens portion 710 proximal to an optical redirector 231 that is concave, to maintain a gap 730 between the world-side lens portion 710 and the optical redirector 231. The lens assembly 700 may include a world-side surface 724 of an eye-side lens portion 720 proximal to the optical redirector 231 that is concave, to maintain a gap 732 between the eye-side lens portion 720 and the optical redirector 231. Using such curved surfaces improves the cosmetics of the lens assembly, by reducing the number of planar surfaces which produce planar reflections of environmental light. In some embodiments, one or more protrusions or spacers, which support the optical redirector 231 can be smoother, or even non-existent such that the optical redirector 231 can abut directly against a surface 714 or a surface 724, or both.

Figure 8:
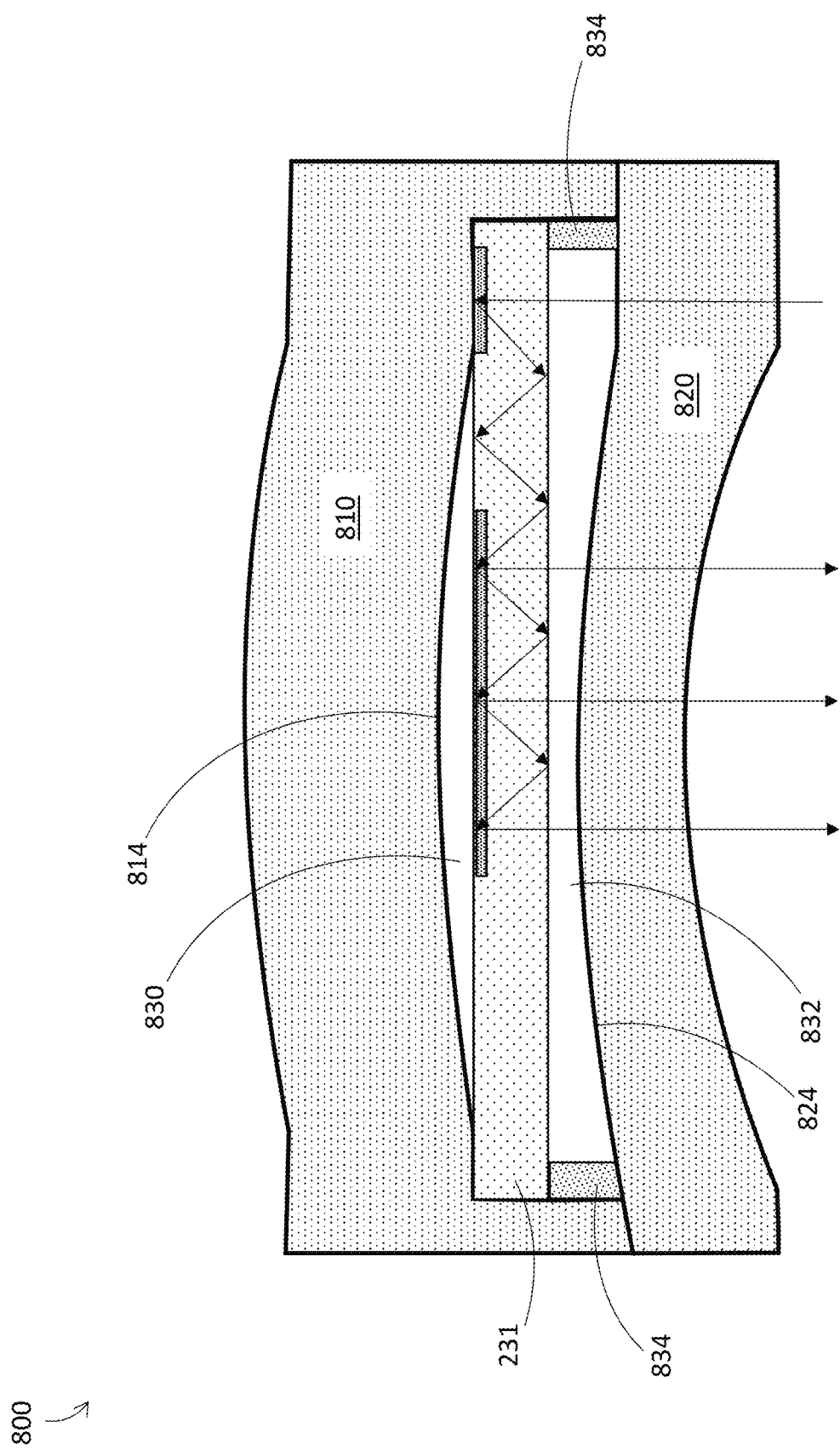

FIG. 8 illustrates a diagram of a lens assembly 800 in accordance with some embodiments. In some embodiments, the lens assembly 800 may implement or be implemented by aspects of the lens assemblies 500, 600, and 700 as described with reference to FIGS. 5 through 7, respectively. The lens assembly 800 may include an eye-side surface 814 of a world-side lens portion 810 proximal to an optical redirector 231 that is concave, to maintain a gap 830 between the world-side lens portion 810 and the optical redirector 231. The lens assembly 800 may also include a world-side surface 824 of the eye-side lens portion 820 proximal to that optical redirector 231 that is convex, with a gap 832 maintained between the eye-side lens portion 820 and the optical redirector 231. The gap 832 can be maintained by at least one spacer 834, which can be similar to the at least one spacer 534 in FIG. 5. Alternatively, the gap 832 could be maintained by at least one protrusion from the eye-side lens 820, which functions similarly to the at least one spacer 834. As another alternative, the optical redirector 231 could be mounted to the world-side lens 810 with adhesive or fasteners, such that there is no need for the spacer 834 or similar structures. Using a convex surface 824 further improves the cosmetics of the lens assembly, by having as many surfaces as possible be similarly shaped to produce environmental light reflections which closely resemble those produced by traditional eyeglass lenses.

Figure 9:
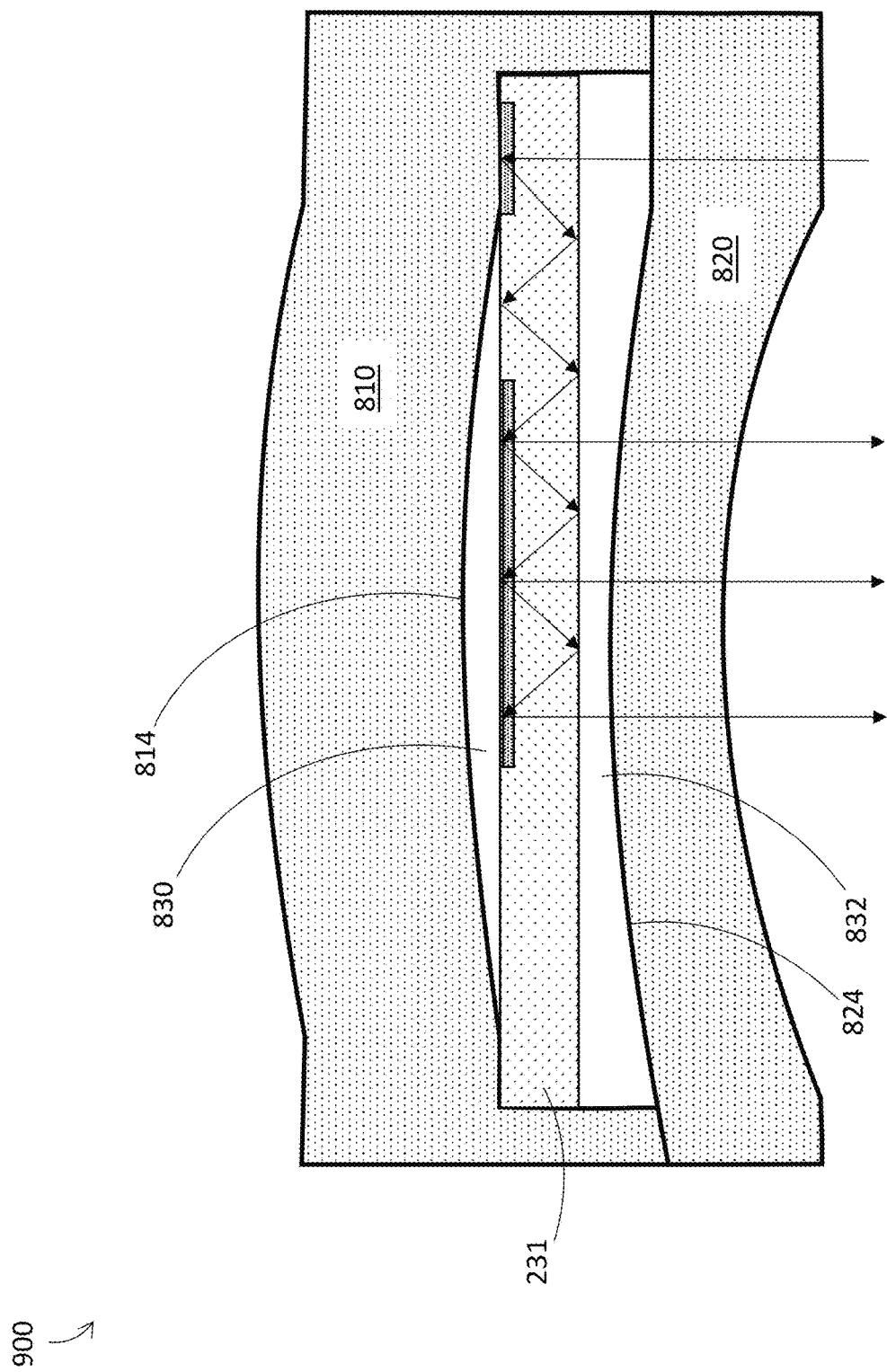

FIG. 9 illustrates a diagram of a lens assembly 900 in accordance with some embodiments. In some embodiments, the lens assembly 900 may implement or be implemented by aspects of the lens assemblies 500, 600, 700, and 800 as described with reference to FIGS. 5 through 8, respectively. The lens assembly 900 may does not include any spacers. Instead, an optical redirector 231 of the lens assembly 900 can be mounted to a world-side lens portion 810, such as by adhesive or fasteners. It is within the scope of the present disclosure that the features of the lens assemblies discussed with reference to FIGS. 5, 6, 7, 8, and 9 be combinable as appropriate for a given application.

Figure 10:
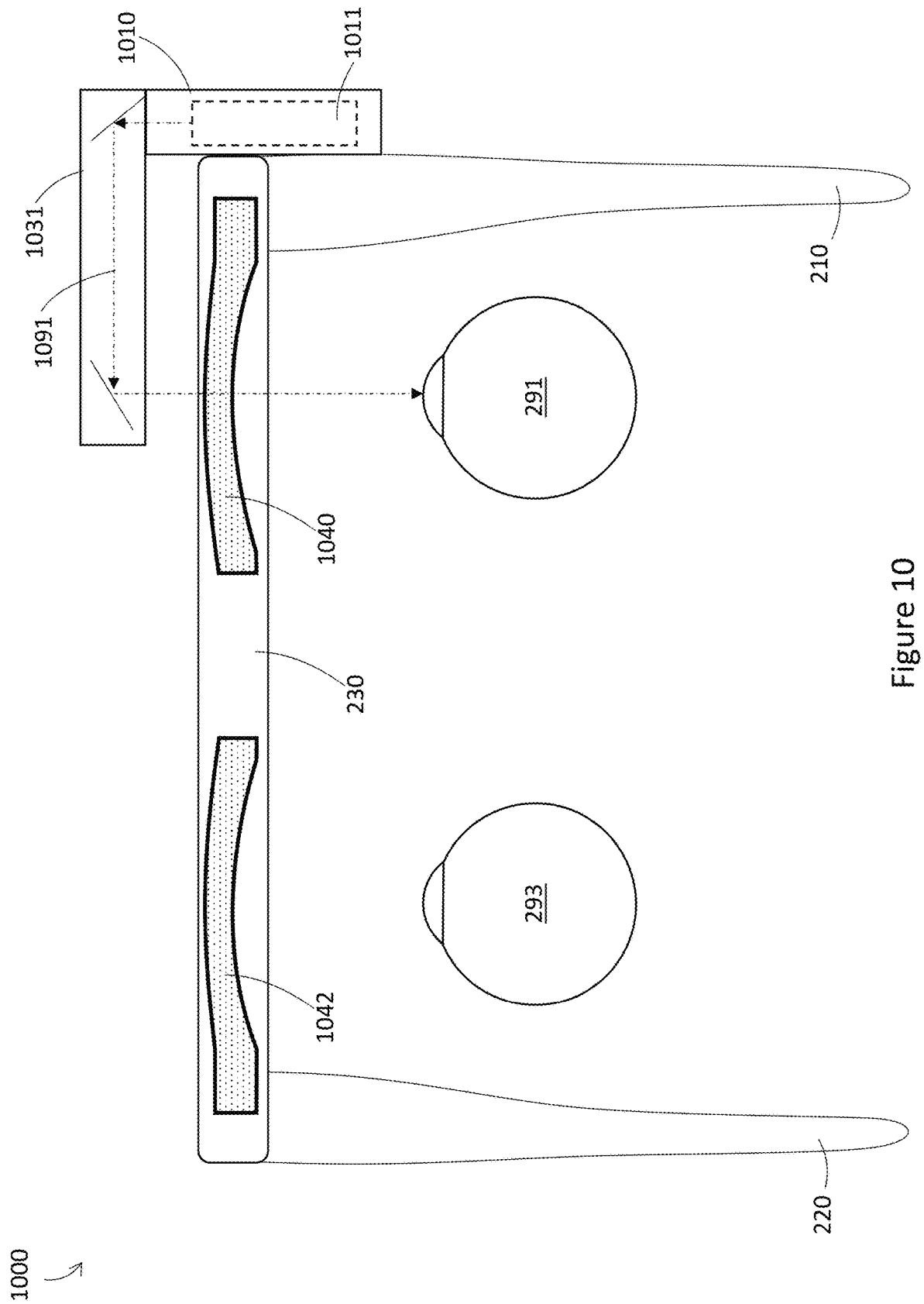
FIG. 10 illustrates a diagram of a wearable display device in accordance with some embodiments.

FIG. 10 illustrates a diagram of a wearable display device 1000 in accordance with some embodiments. The wearable display device 1000 may implement or be implemented by aspects of the wearable display devices 100, 200, 300, and 400 as described with reference to FIGS. 1 through 4, respectively. The wearable display device 1000 may include a support structure, which includes a first arm 210, a second arm 220, and a front frame 230. The support structure can carry appropriate components of the wearable display device 1000, as described herein. The wearable display device 1000 includes a mounting component 1010, which can carry a light engine 1011 and an optical redirector 1031. The front frame 230 can carry a lens 1040 to be positioned in front of an eye 291 of a user, and front frame 230 can carry a lens 1042 to be positioned in front of an eye 293.

In some embodiments, instead of optical redirector being incorporated with or affixed to a lens or lens assembly, the optical redirector 1031 is carried separately from the lens 1040. A display light 1091 from the light engine 1011 may be received by the optical redirector 1031, which in turn redirects the display light 1091 towards the eye 291, through the lens 1040. The lens 1040 can influence the display light 1091, which is received by the eye 291. The optical redirector 1031 may include one or more reflectors, which redirect the display light 1091, but other forms of optical redirector are within the scope of the present disclosure. For example, the optical redirector 1031 could be a light guide redirector and positioned separately from the lens 1040. In some other embodiments, the optical redirector 1031 may include a prism redirector. Although FIG. 10 illustrates only a single light engine 1011 and optical redirector 1031, which cooperate to provide the display light 1091 to the eye 291, it is within the scope of the present disclosure for another light engine and optical redirector to be positioned to provide the display light 291 to the eye 293.

In each of the exemplary display architectures illustrated in FIGS. 5 through 10, there is an optical element in the path of display light which is redirected towards an eye of the user (eye-side lens portions 520, 620, 720, 820, and lens 1040). Each of these optical elements can influence display light which passes therethrough. In the case of components with a single optical power (e.g. single vision lens portions), this can converge or diverge the display light. In the case of components with multiple optical powers (such as multi-focal lens portions), this can cause distortion of the display light. It is desirable to reduce or eliminate such distortions.

Throughout the present disclosure, concepts regarding optical power are discussed. For clarity, terminology of "increase", "decrease", "high", and "low", or conjugations of these terms, with reference to optical powers, refers to magnitude of the optical power. For example, "increasing" an optical power of 3 by 1 would result in an optical power of 4, and "increasing" an optical power of −3 by 1 would result in an optical power of −4. As a similar example, "decreasing" an optical power of 3 by 1 would result in an optical power of 2, and "decreasing" an optical power of −3 by 1 would result in an optical power of −2. As further examples, an optical power of 6 is "higher" than an optical power of 3; an optical power of −6 is "higher" than an optical power of −3; an optical power of 3 is "lower" than an optical power of 6; and an optical power of −3 is "lower" than an optical power of −6.

On the other hand, with reference to optical power, terminology of "add" refers to a shift in optical power in the positive direction, whereas terminology of "minus" or "negative add" refers to a shift in optical power in the negative direction. As examples, an "optical power add" or "add optical power" of 3 diopters would bring an optical power of 2 diopters to 5 diopters, and would bring an optical power of −2 diopters to 1 diopter. As other examples, an "optical power minus" or "minus optical power" of 3 diopters would bring an optical power of 2 diopters to −1 diopter, and would bring an optical power of −2 diopters to −5 diopters.

Figure 11:
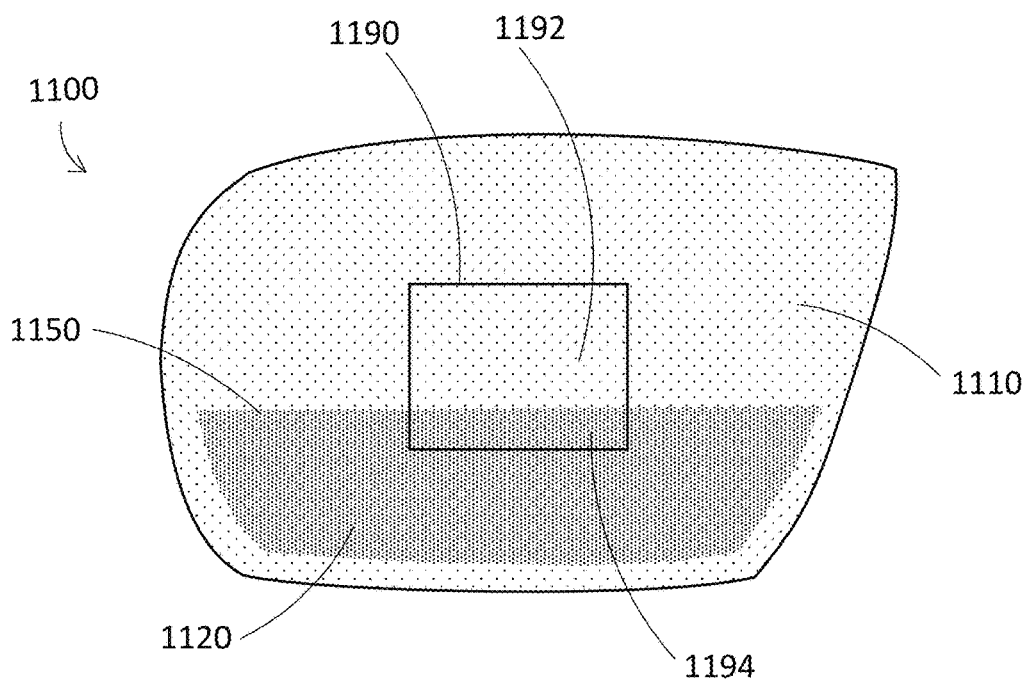
FIGS. 11 through 16 illustrate diagrams of multi-focal lenses in accordance with some embodiments.

FIG. 11 illustrates a diagram of a multi-focal lens 1100 in accordance with some embodiments. The multi-focal lens 1100 may include a region 1110 having a first optical power and a region 1120 having a second optical power different from the first optical power. An optical power of the multi-focal lens 1100 can transition between the first optical power and the second optical power across a transition region 1150. In the example of FIG. 11, the transition region 1150 can be a boundary between the region 1110 and the region 1120. This boundary can be a sharp discontinuity, forming two distinct regions of different optical power. This discontinuity can be visible to a user and to bystanders. Such a lens portion can be referred to as bi-focal.

The second optical power can provide optical power add compared to the first optical power, resulting in a lens portion having two functional regions: the region 1110 optimized for long-distance viewing, and the region 1120 optimized for close-distance viewing. A user of such a bi-focal can select which region of the lens to look through based on the distance to which they want to focus. In the example of FIG. 11, the region 1120 is positioned in a bottom area of the multi-focal lens 1100, but other arrangements are within the scope of the present disclosure.

The transition region 1150 can be problematic for display light which passes through the multi-focal lens 1100, such as if the multi-focal lens 1100 is implemented in a wearable display device between an optical redirector and an eye of the user (e.g., if the multi-focal lens 1100 is implemented as eye-side lens portion 520, 620, 720, 820 or lens 1040 discussed above). In the example of FIG. 11, a display light 1190 passes through the multi-focal lens 1100 over an area which spans the transition region 1150. Stated differently, an optical redirector has an output eyebox which passes through the multi-focal lens 1100 in the area shown by 1190. As a result, visible discontinuity or aberration can be seen in the display light 1190 between a portion of a display light 1192 which passes through the region 1110 and a portion of a display light 1194 which passes through the region 1120.

The above issue could be addressed by using a display architecture in which multi-focal lens portions are not positioned between an optical redirector and an eye of the user, such as discussed later with reference to FIGS. 26 and 27. Alternatively, the above issue could be addressed with deliberate shaping and positioning of regions of a multi-focal lens portions, or deliberate positioning and aiming of a light engine or optical redirector, such that display light from a light engine via an optical redirector does not pass through a transition region. In particular, it is desirable for display light which forms a display visible to a user to not pass through a transition region; it is acceptable within the context of the present disclosure however that stray display light which does not form the display passes through the transition region. Stated differently, it is desirable for an output eyebox of an optical redirector to pass through regions of multi-focal lenses outside of transition regions.

Figure 12:
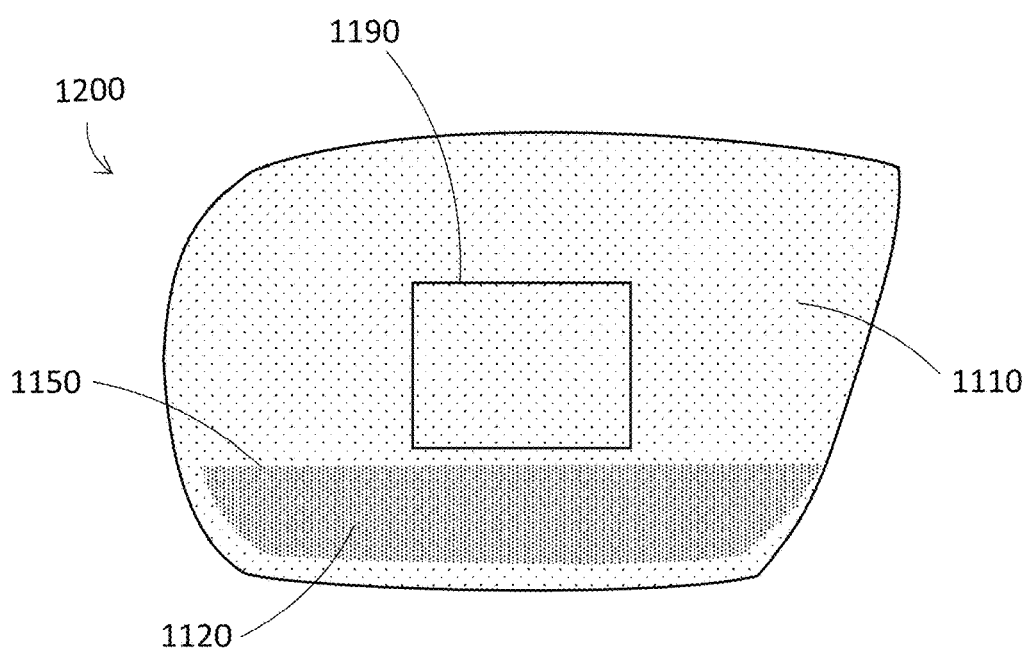

FIG. 12 illustrates a diagram of a multi-focal lens 1200 in accordance with some embodiments. The multi-focal lens 1200 may implement or be implemented by aspects of the multi-focal lens 1100 as described with reference to FIG. 11. The multi-focal lens 1200 may include a region 1110 and a region 1120 having different optical powers, sized so that a display light 1190 does not pass through a transition region 1150. The transition region 1150 may be moved spatially lower in the multi-focal lens 1200, such that the region 1120 is smaller, and the display light 1190 passes through the region 1110, and thus discontinuity or aberration of the display light 1190 caused by the transition region 1150 is avoided. That is, the region 1110, the region 1120, and the transition region 1150 of the multi-focal lens 1200 are shaped so that an output eyebox of an optical redirector passes through the region 1110 in the area shown by 1190.

Figure 13:
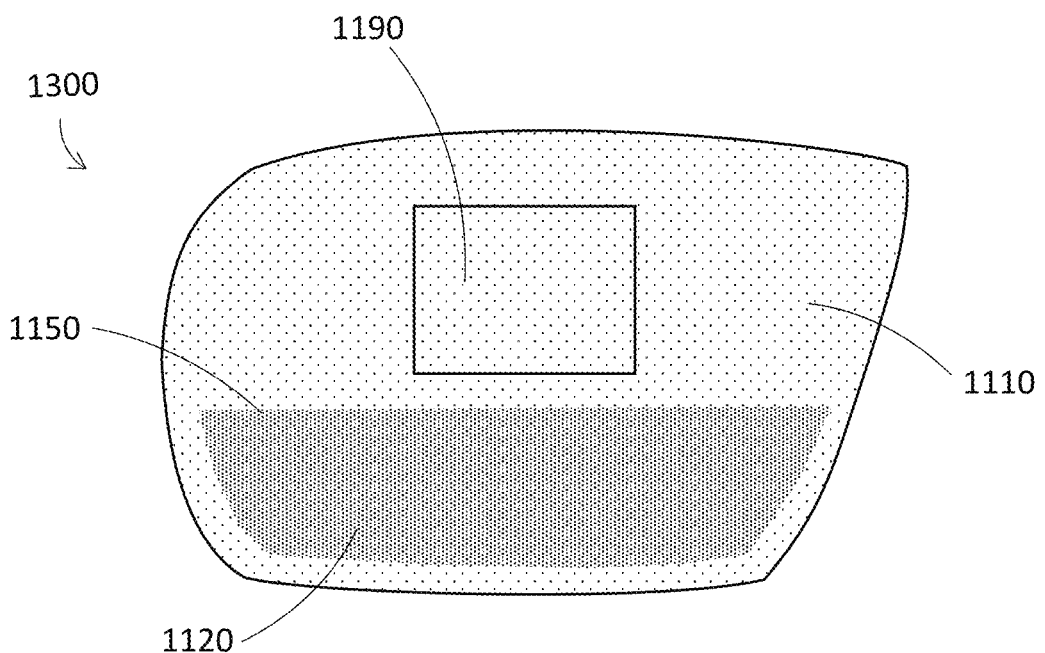

FIG. 13 illustrates a diagram of a multi-focal lens 1300 in accordance with some embodiments. The multi-focal lens 1300 may implement or be implemented by aspects of the multi-focal lens 1100 and 1200 as described with reference to FIGS. 11 and 12, respectively. The multi-focal lens 1300 may include a region 1110 and a region 1120 having different optical powers, where a display light 1190 is aimed to not pass through a transition region 1150. In some embodiments, an area through which the display light 1190 passes is positioned spatially higher in the multi-focal lens 1300, such that the display light 1190 passes through the region 1110, and thus discontinuity or aberration of the display light 1190 caused by the transition region 1150 is avoided. This could be achieved through appropriate alignment and positioning of the multi-focal lens 1300, a light engine, and an optical redirector in a wearable display device. That is, an output eyebox of an optical redirector is positioned and oriented relative to the multi-focal lens 1300 to pass through the region 1110 in the area shown by 1190.

Figure 14:
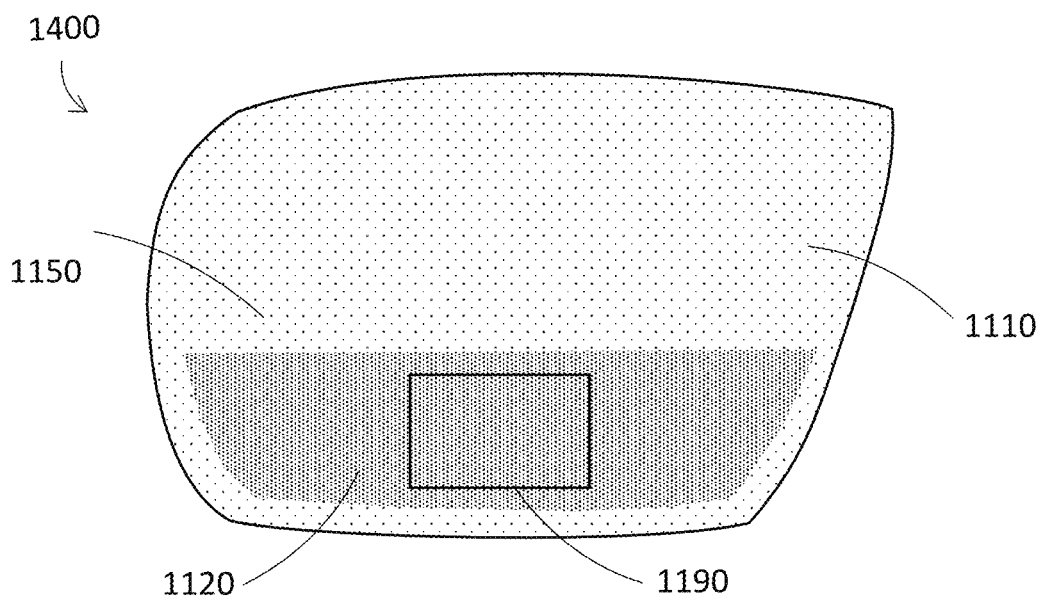

FIG. 14 illustrates a diagram of a multi-focal lens 1400 in accordance with some embodiments. The multi-focal lens 1400 may implement or be implemented by aspects of the multi-focal lens 1100, 1200, and 1300 as described with reference to FIGS. 11 through 13, respectively. The multi-focal lens 1400 includes a region 1110 and a region 1120 having different optical powers, where a display light 1190 is aimed to not pass through a transition region 1150. In some embodiments, an area through which the display light 1190 passes is positioned spatially lower in the multi-focal lens 1400, such that the display light 1190 passes through the region 1120, and thus discontinuity or aberration of the display light 1190 caused by the transition region 1150 is avoided. This could be achieved through appropriate alignment and positioning of the multi-focal lens 1400, a light engine, and an optical redirector in a wearable display device. That is, an output eyebox of an optical redirector is positioned and oriented relative to the multi-focal lens 1400 to pass through the region 1120 in the area shown by 1190.

Figure 15:
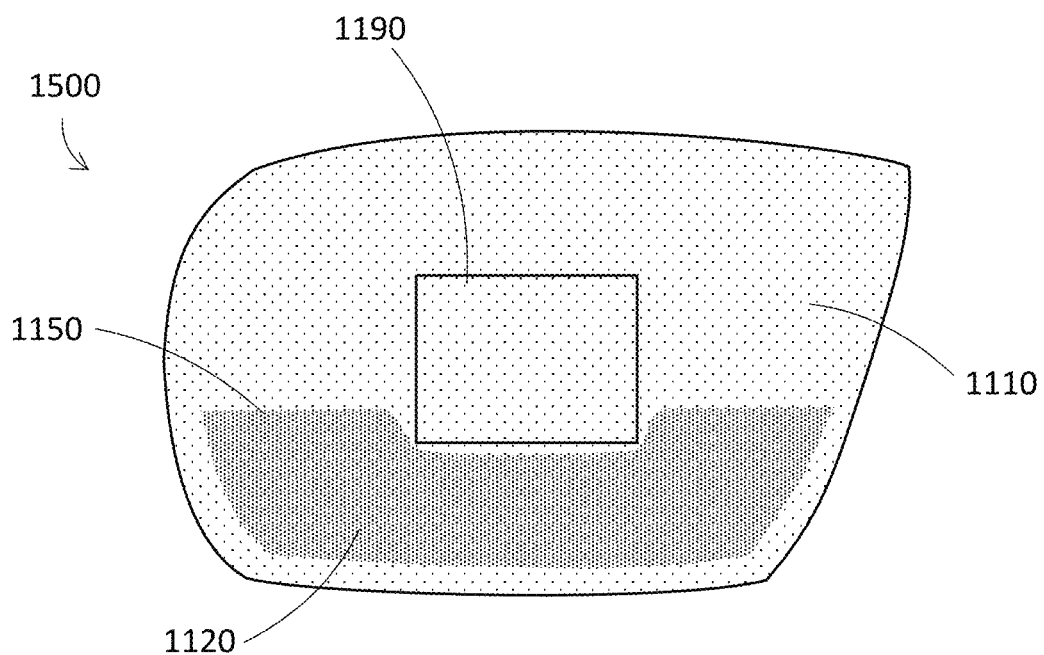

FIG. 15 illustrates a diagram of a multi-focal lens 1500 in accordance with some embodiments. The multi-focal lens 1500 may implement or be implemented by aspects of the multi-focal lens 1100, 1200, 1300, and 1400 as described with reference to FIGS. 11 through 14, respectively. The multi-focal lens 1500 includes a region 1110 and a region 1120 having different optical powers, sized and shaped so that a display light 1190 does not pass through a transition region 1150. The transition region 1150 is deliberately sculpted around the area through which the display light 1190 will pass, thereby avoiding discontinuity or aberration of the display light 1190, while also minimizing the reduction are area of the region 1120. That is, the region 1110, the region 1120, and the transition region 1150 of the multi-focal lens 1500 are shaped so that the transition region 1150 circumvents around an output eyebox of an optical redirector.

Figure 16:
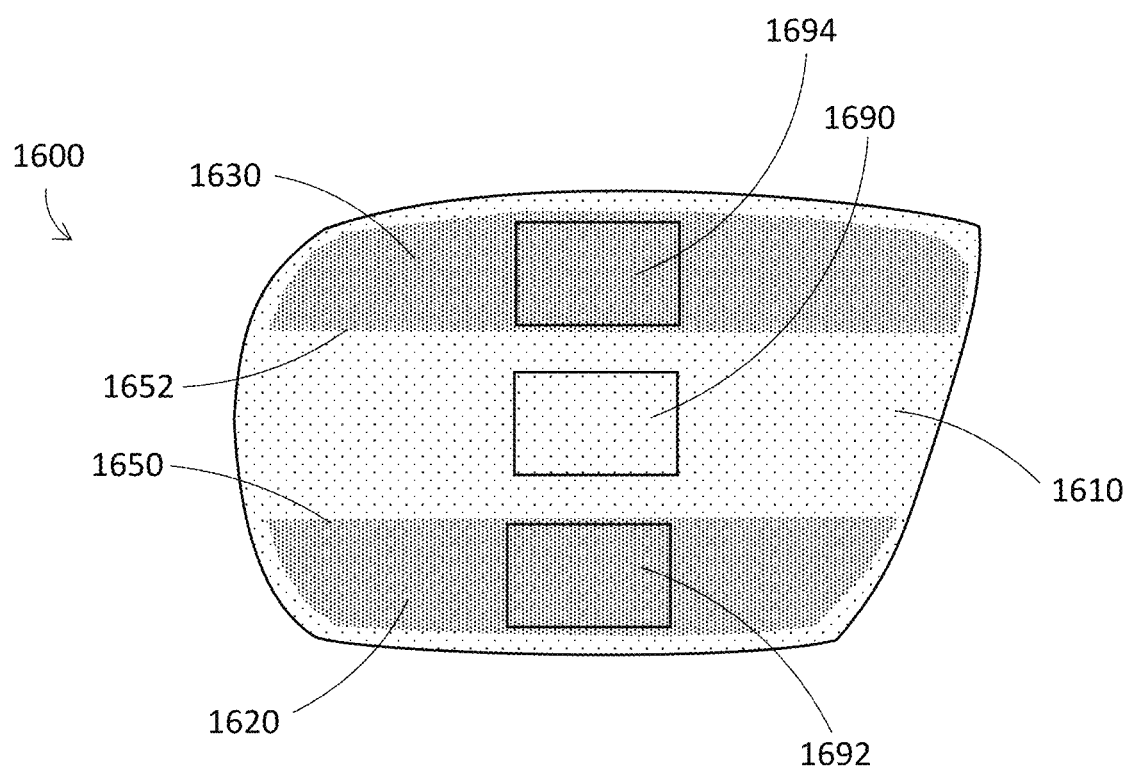

FIG. 16 illustrates a diagram of a multi-focal lens 1600 in accordance with some embodiments. The multi-focal lens 1600 may implement or be implemented by aspects of the multi-focal lens 1100, 1200, 1300, 1400, and 1500 as described with reference to FIGS. 11 through 15, respectively. The multi-focal lens 1600 includes a region 1610, a region 1620, and a region 1630. The region 1610 can have a first optical power, and the region 1620 can have a second optical power different from the first optical power. The region 1630 could have a third optical power different from the first optical power. The third optical power could match the second optical power, or could be different from the second optical power.

The multi-focal lens 1600 can be referred to as tri-focal, due to having three separate regions with at least two different optical powers. In some embodiments, the second optical power could provide an optical power add compared to the first optical power, and the first optical power could provide an optical power add compared to the third optical power, such that the multi-focal lens 1600 is suitable for long-distance viewing, intermediate-distance viewing, and close-range viewing, based on whether a user is looking the top region, middle region, or bottom region, respectively, of the multi-focal lens 1600. In some other embodiments, the second optical power and the third optical power could each provide an optical power add relative to the first optical power, such that the multi-focal lens 1600 is suitable for close-range viewing, long-distance viewing, and close-range viewing, based on whether a user is looking the top region, middle region, or bottom region, respectively, of the multi-focal lens 1600. An exemplary use case for such an implementation is with airplane pilots, where gauges and controls can be positioned in both the top and bottom of a user's view, with a window of the airplane being positioned in the center of the user's view.

An optical power of the multi-focal lens 1600 can transition between the first optical power to the second optical power across a transition region 1650. An optical power of the multi-focal lens 1600 can transition between the first optical power and the third optical power across a transition region 1652. The transition regions 1650 and 1652 can be problematic for display light which passes through the multi-focal lens 1600, such as if the multi-focal lens 1600 is implemented in a wearable display device between an optical redirector and an eye of the user. If display light passes over an area which spans the transition region 1650 or 1652, visible discontinuity or aberration may be seen in the display light.

To address this issue, the regions 1610, 1620, and 1630 can be shaped, oriented, or positioned so that display light passing through the multi-focal lens 1600 does not span across the transition region 1650 or the transition region 1652. Alternatively or additionally, a light engine or optical redirector can be positioned, oriented, structured, or aimed to direct display light to pass through the multi-focal lens 1600 without spanning across the transition region 1650 or the transition region 1652. The display light 1690 passes through the multi-focal lens 1600 in the region 1610, the display light 1692 passes through the multi-focal lens 1600 in the region 1620, and the display light 1694 passes through the multi-focal lens 1600 in the region 1630. That is, the regions of the multi-focal lens 1600 are shaped or positioned relative to an optical redirector, or an optical redirector is positioned and oriented relative to the regions of the multi-focal lens 1600, such that an output eyebox of the optical redirector passes outside of the transition regions 1650 and 1652.

In the above examples, a light engine and optical redirector can be positioned, oriented, structured, or arranged to provide display light which passes through a lens portion outside of transition regions of the lens portion in a fixed manner, a selective manner, or an arrayed manner. Fixed manner refers to a case where a wearable display device is designed and manufactured for display light to pass through a certain region of a lens portion, with little to no adjustability after the wearable display device is made. A selective manner refers to a case where the wearable display device is capable of directing display light through multiple regions of different optical power of a lens portion, and a specific region can be selected by a user or by an application on the wearable display device. An arrayed manner refers to a case where a wearable display device is capable of directing display light through multiple regions of different optical power of a lens portion, and different or tuned displayed content is provided through the different regions of the lens portion simultaneously.

The above examples generally relate to multi-focal lens portions where transition regions between regions of different optical power are visible, discontinuous boundaries. However, multi-focal lens portions with smoother transition regions that are not visibly apparent are popular, at least in part because they are preferred cosmetically. Such lens portions can be referred to as varifocal, and can include a continuous change in optical power over at least one area of a lens portion. Exemplary varifocal lens portions can include progressive lens portions, which refers to an optical power add in a spatially lower area of the lens portion relative to a spatially upper area of the lens portion. Exemplary lens portions can also include regressive lens portions, which refers to an optical power add in a spatially upper area of the lens portion relative to a spatially lower area of the lens portion. Several exemplary varifocal lens portions are discussed below.

Figure 17:
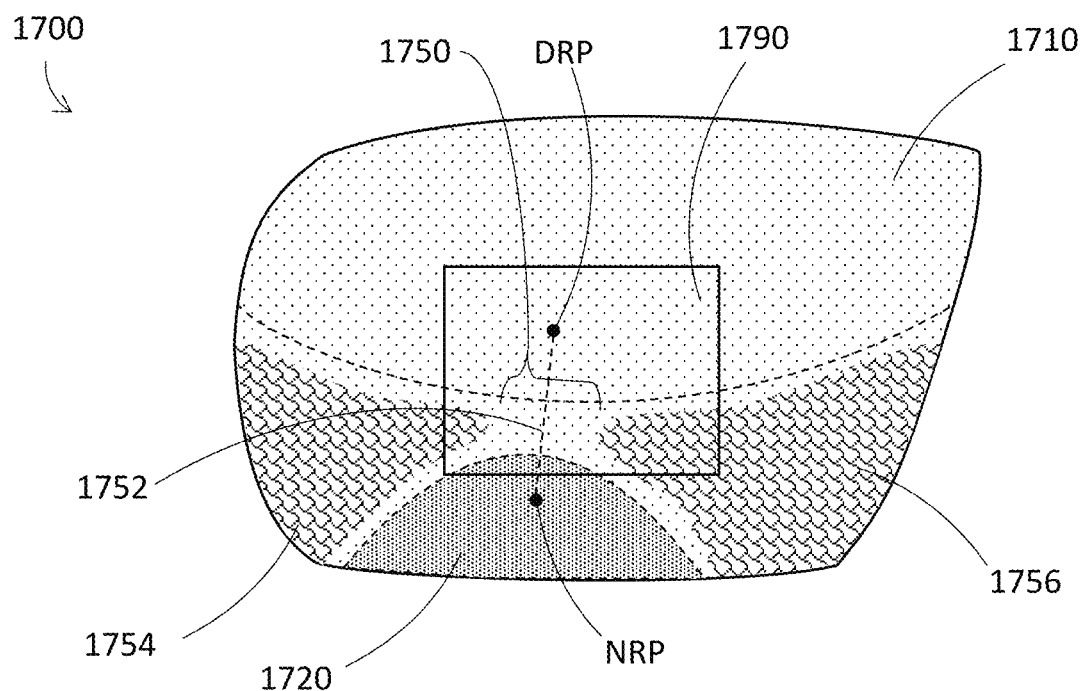
FIGS. 17 through 21 illustrate diagrams of varifocal lenses in accordance with some embodiments.

FIG. 17 illustrate a diagram of a varifocal lens 1700 in accordance with some embodiments. The varifocal lens 1700 is a varifocal lens portion, having a region 1710 having a first optical power and a region 1720 having a second optical power different from the first optical power. To achieve a smooth transition, an optical power of the varifocal lens 1700 can transition between the first optical power and the second optical power across a transition region, which can include a corridor 1750, a varifocal line 1752, a blending region 1754, and a blending region 1756. The corridor 1750 is defined by a continuous function along the varifocal line 1752 between the first optical power and the second optical power. The second optical power can provide an optical power add compared to the first optical power, the varifocal line 1752 can be a line which extends between a distance reference point (DRP) in the region 1710 to a near-reference point (NRP) in region 1720, and the function could be an add-power function which defines a continuous add in optical power between the DRP and the NRP. The DRP can be a point on a lens portion having the smallest optical power add, and the NRP can be a point on the lens portion having the greatest optical power add.

The varifocal lens 1700 may include a blending region 1754 and a blending region 1756, lateral to and on opposite sides of the varifocal line 1752, and between the region 1710 and the region 1720. The blending region 1754 and the blending region 1756 have respective optical powers, which smoothly transition between the region 1710 and 1720 (i.e. without visible discontinuity). In order to maintain a smooth transition between the region 1710 and the region 1720 across the entire varifocal lens 1700, the blending regions 1754 and 1756 may have non-ideal optical performance. Often, this can be in the form of astigmatism introduced by cylindrical optical power in the blending regions 1754 and 1756.

The dimensions of the blending regions 1754 and 1756 are determined from the boundaries of region 1710, region 1720, and the varifocal line 1752 which runs between the region 1710 and the region 1720. The threshold for non-ideal optical performance may be one-eighth or one-quarter of a diopter of optical power difference from the desired optical power. Thus, the corridor 1750 can include a region of the lens spanning from the region 1710 to the region 1720, with a width spanning away from the varifocal line 1752 in approximately opposite directions until the non-ideal optical performance threshold is met.

To summarize, a varifocal lens portion may include a region 1710 having a first optical power, a region 1720 having a second optical power, a corridor 1750 between the region 1710 and the region 1720, the corridor 1750 having an optical power which transitions between the first optical power and the second optical power. A blending region 1754 can be positioned adjacent each of the region 1710, the region 1720, and the corridor 1750 (for example on a left side of the varifocal lens 1700). Another blending region 1756 can be positioned adjacent each of the region 1710, the region 1720, and the corridor 1750, opposite the blending region 1754 (e.g., on a right side of the varifocal lens 1700). The corridor 1750, the blending region 1754, and the blending region 1756 together can be called a transition region.

When designing a varifocal lens portion, the boundaries of the regions 1710 and 1720 can be adjusted to maximize the area of the lens which has desired optical performance characteristics, while minimizing the area of the blending regions 1754 and 1756, to maximize usable area of the lens portion. Such a design is called a hard design, and will tend to have particularly strong or harsh non-ideal optical characteristics in the blending regions 1754 and 1756. Taken to the extreme where there are no blending regions, no corridor, and where the regions 1710 and the region 1720 are adjacent each other, there will be a visible discontinuity between the region 1710 and the region 1720. Alternatively, when designing the varifocal lens 1700, the boundaries of the regions 1710 and 1720 can be adjusted to reduce non-ideal optical performance characteristics of the blending regions 1754 and 1756, to improve the optical usability of the blending regions 1754 and 1756, which will reduce the size of the region 1710 and the region 1720. Such a design is called a soft design.

The blending regions 1754 and 1756, and in some cases the corridor 1750, can be problematic for display light which passes through the varifocal lens 1700, such as if the varifocal lens 1700 is implemented in a wearable display device between an optical redirector and an eye of the user. In some embodiments, portions of a display light 1790 pass through the varifocal lens 1700 over an area which spans the blending region 1754, the corridor 1750, and the blending region 1756. That is, an optical redirector has an output eyebox which passes through the varifocal lens 1700 in the area shown by 1790. Because of the non-ideal optical characteristics of the blending regions 1754 and 1756, visible aberrations may be seen in portions of the display light 1790 which pass therethrough. Even if the display light 1790 passes through a small enough area of the varifocal lens 1700 to fit entirely within the corridor 1750, the variable optical power throughout the corridor 1750 may cause distortions of display light passing therethrough, such as a display which appears tilted.

The above issues could be addressed by using a display architecture in which multi-focal (including varifocal) lens portions are not positioned between an optical redirector and an eye of the user, such as discussed later with reference to FIGS. 26 and 27. Alternatively, the above issues could be addressed with deliberate shaping or positioning of regions of varifocal lens portions, or with deliberate positioning and control of display hardware, such that display light from a light engine via an optical redirector does not pass-through transition regions, including blending regions or corridors. It is desirable for display light which forms a display visible to a user to not pass-through blending regions or corridors (i.e., through regions outside of corridors and blending regions); however, it is acceptable within the context of the present disclosure that stray display light which does not form the display passes through blending regions or corridors. Stated differently, it is desirable for an output eyebox of an optical redirector to pass through regions of varifocal lenses outside of corridors and blending regions.

Figure 18:
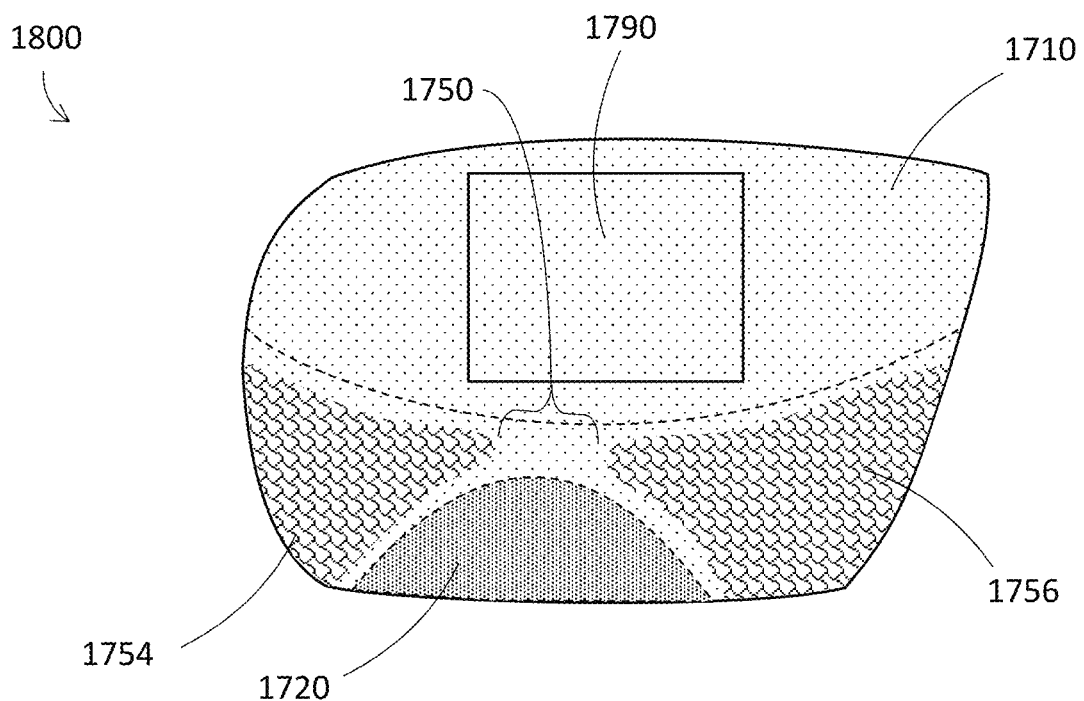

FIG. 18 illustrate a diagram of a varifocal lens 1800 in accordance with some embodiments. In some embodiments, the varifocal lens 1800 may implement or be implemented by aspects of the varifocal lens 1700 as described with reference to FIG. 17. The varifocal lens 1800 may include a region 1710 and a region 1720 having different optical powers, where a display light 1790 does not pass through a transition region including a corridor 1750, a blending region 1754, and a blending region 1756. A light engine and optical redirector of a wearable display device can be positioned, oriented, structured, or controlled to aim the display light 1790 such that the display light 1790 passes through the region 1710, and thus aberration of the display light 1790 caused by the blending region 1754, the blending region 1756, and the corridor 1750 is avoided. That is, an output eyebox of an optical redirector is positioned and oriented relative to the varifocal lens 1800 to pass through the region 1710 in the area shown by 1790.

Figure 19:
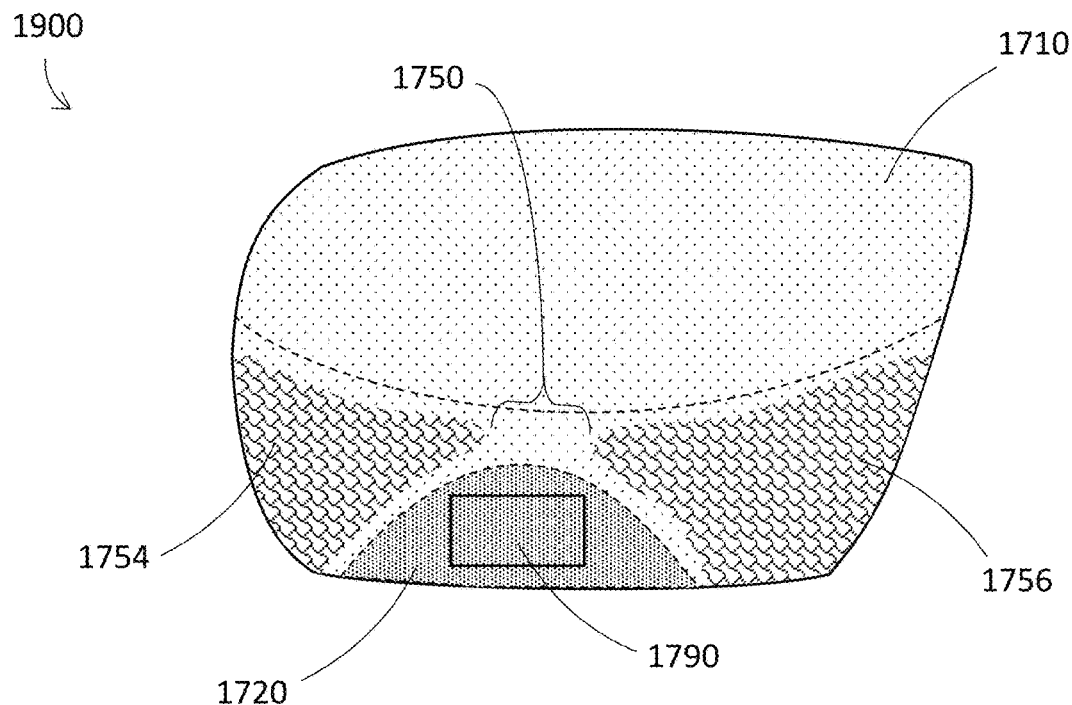

FIG. 19 illustrate a diagram of a varifocal lens 1900 in accordance with some embodiments. In some embodiments, the varifocal lens 1900 may implement or be implemented by aspects of the varifocal lens 1700 and 1800 as described with reference to FIGS. 17 and 18, respectively. The varifocal lens 1900 may include a region 1710 and a region 1720 having different optical powers, where a display light 1790 does not pass through a transition region including a corridor 1750, a blending region 1754, and a blending region 1756. A light engine and optical redirector of a wearable display device can be positioned, oriented, structured, or controlled to aim the display light 1790 such that the display light 1790 passes through the region 1720, and thus aberration of the display light 1790 caused by the blending region 1754, the blending region 1756, and the corridor 1750 is avoided. That is, an output eyebox of an optical redirector is positioned and oriented relative to the varifocal lens 1900 to pass through the region 1720 in the area shown by 1790. In addition or alternative to deliberate directing of display light, a varifocal lens portion can be designed or shaped to optimize viewability of display light which passes therethrough. Several examples are discussed below.

Figure 20:
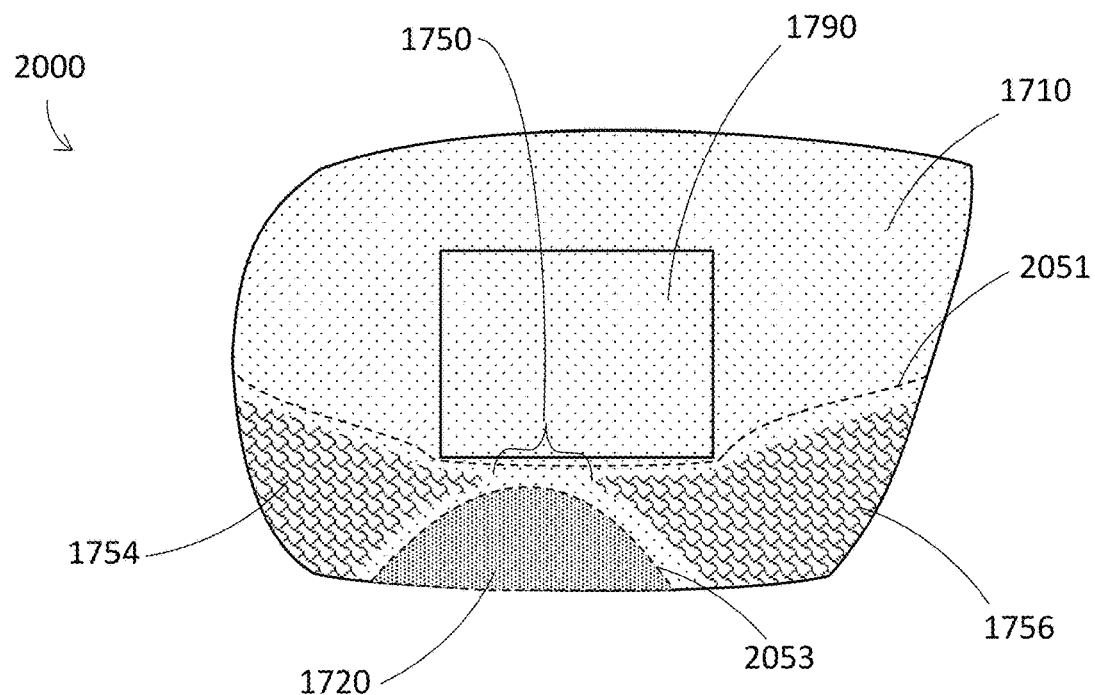

FIG. 20 illustrate a diagram of a varifocal lens 2000 in accordance with some embodiments. In some embodiments, the varifocal lens 2000 may implement or be implemented by aspects of the varifocal lens 1700, 1800, and 1900 as described with reference to FIGS. 17 through 19, respectively. The varifocal lens 2000 may include a region 1710 and a region 1720 having different optical powers, where a display light 1790 does not pass through a transition region including a corridor 1750, a blending region 1754, and a blending region 1756. The region 1710 or the region 1720 can be shaped deliberately to encompass an area of the varifocal lens 2000 through which the display light 1790 passes. That is, the transition region including the corridor 1750, the blending region 1754, and the blending region 1756 can be shaped to be outside of an area of the varifocal lens 2000 through which the display light 1790 passes.

In the example of FIG. 20, this is illustrated by boundaries 2051 and 2053 of the transition region being shifted downwards, such that the display light 1790 passes through only region 1710. The shaping of regions is not limited to just shifts across an area of a lens portion, but rather as can be seen with the boundary 2051 in FIG. 20, the shape of the boundary itself may be deliberately designed to follow a path which extends around an area of the varifocal lens 2000 which is outside of an area through which the display light 1790 passes. That is, the region 1710, the region 1720, the corridor 1750, the blending region 1754, and the blending region 1756 of the varifocal lens 2000 are shaped so that the boundary 2051 circumvents around an output eyebox of an optical redirector.

Figure 21:
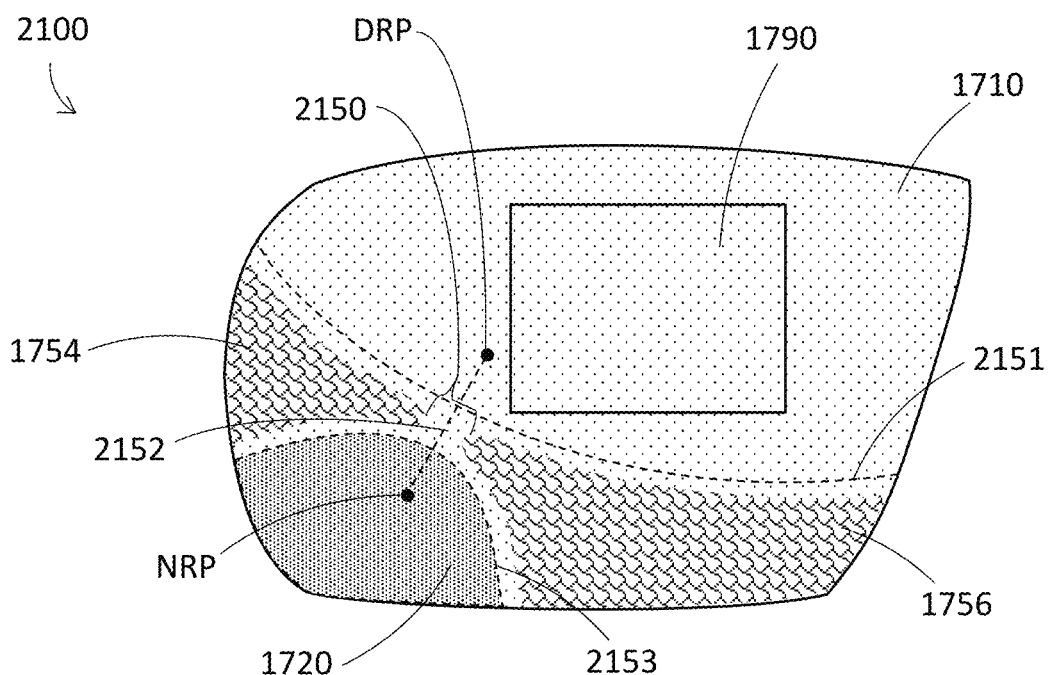

FIG. 21 illustrate a diagram of a varifocal lens 2100 in accordance with some embodiments. In some embodiments, the varifocal lens 2100 may implement or be implemented by aspects of the varifocal lens 1700, 1800, 1900, and 2000 as described with reference to FIGS. 17 through 20, respectively. The varifocal lens 2100 may include a region 1710 and a region 1720 having different optical powers, where display light 1790 does not pass through a transition region including a corridor 2150, a blending region 1754, and a blending region 1756. The region 1710 or the region 1720 can be shaped deliberately to encompass an area of the varifocal lens 2100 through which the display light 1790 passes. That is, the transition region including the corridor 2150, the blending region 1754, and the blending region 1756 can be shaped to be outside of an area of the varifocal lens 2100 through which the display light 1790 passes.

In the example of FIG. 21, this is illustrated by the orientation of the corridor 2150 being changed compared to other implementations discussed herein. In some embodiments, instead of the corridor 2150 generally extending vertically in a lens portion 2151, the corridor 2150 extends diagonally in the lens portion 2151. This can be achieved by diagonally separating the DRP and NRP in the varifocal lens 2100, such that varifocal line 2152 extends diagonally therebetween across the varifocal lens 2100. The transition region bounded by boundaries 2151 and 2153 also extends generally diagonally across the varifocal lens 2100 instead of generally horizontally as in other implementations. The region 1710 can be shaped and positioned such that the display light 1790 passes through the region 1710. That is, the region 1710, the region 1720, the corridor 2150, the blending region 1754, and the blending region 1756 of the varifocal lens 2100 are shaped and oriented so that an output eyebox of an optical redirector passes through region 1710.

Although FIGS. 20 and 21 illustrate shape and position changes for region boundaries such that display light 1790 passes through only region 1710, it is within the scope of the present disclosure to change the shape and position of region boundaries so that display light 1790 passes through only region 1720. Additionally, although FIGS. 17 through 21 illustrate varifocal lens portions which have two different regions having different optical power, bridged by a transition region, it is within the scope of the present disclosure to include additional regions having different optical power, bridged by additional transition regions. For example, a varifocal lens portion including three regions of differing optical power could be implemented. In addition to accommodating users who require a multi-focal prescription for vision correction, the present disclosure also encompasses implementations where multi-focal lens portions can be used to optimize display performance in wearable display devices, even if a user does not require a multi-focal prescription for vision correction. Exemplary implementations are discussed below with reference to FIGS. 22 through 25.

Figure 22:
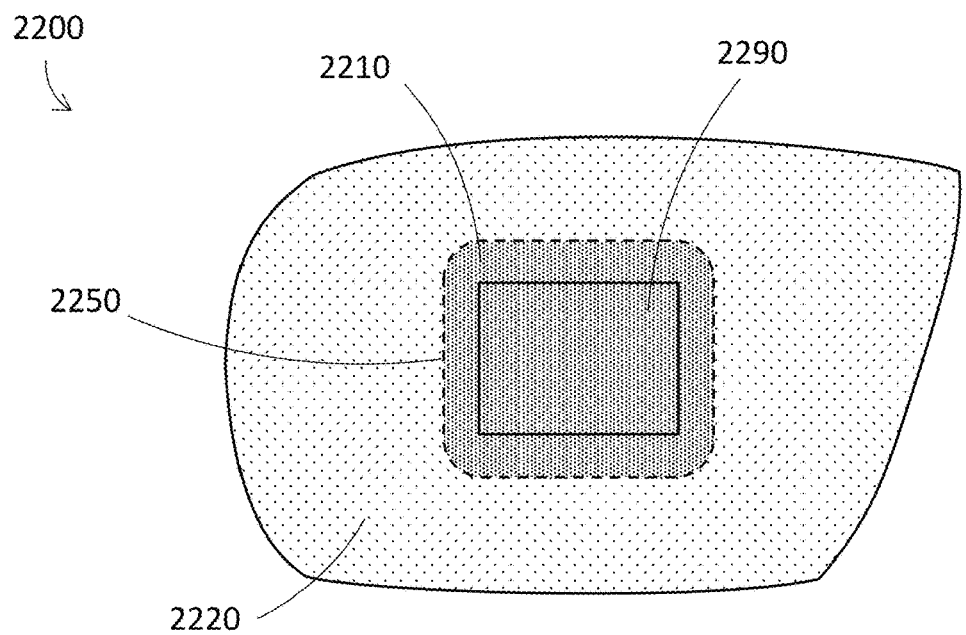
FIG. 22 illustrates a diagram of a multi-focal lens for controlling perceived display distance in accordance with some embodiments.

FIG. 22 illustrates a diagram of a multi-focal lens 2200 for controlling perceived display distance in accordance with some embodiments. The multi-focal lens 2200 may include a first optical power and a region 2220 having a second optical power different from the first optical power. An optical power of the multi-focal lens 2200 can transition between the first optical power and the second optical power across a transition region 2250. The transition region 2250 can be a boundary between region 2210 and a region 2220, which can be a sharp discontinuity, forming two distinct regions of different optical power. Alternatively, the transition region 2250 can be smoothed to be continuous. The multi-focal lens 2200 or a wearable display device in which the multi-focal lens 2200 is implemented, can be designed so that a display light 2290 from a light engine passes through only the region 2210. That is, the region 2210 of the multi-focal lens 2200 is shaped or positioned relative to an optical redirector, or an optical redirector is positioned and oriented relative to the region 2210 of the multi-focal lens 2200, such that an output eyebox of the optical redirector passes through the region 2210. The first optical power can be selected to focus the display light 2290 to produce a virtual display at a desired perceived distance, as is discussed in more detail later with reference to FIGS. 24 and 25.

Figure 23:
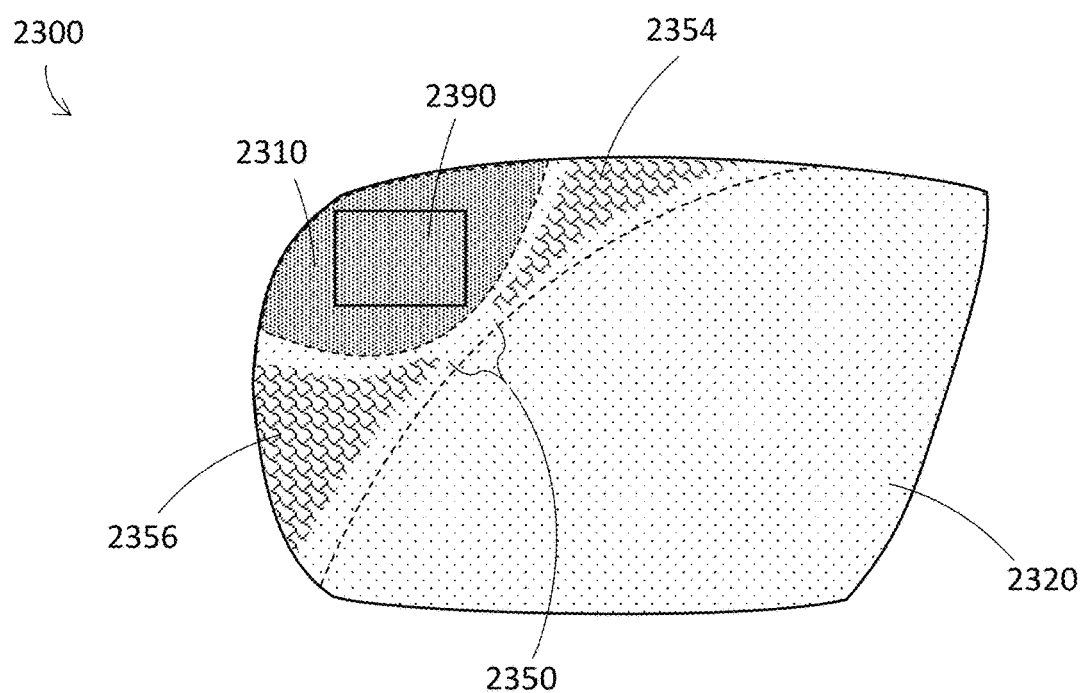
FIG. 23 illustrates a diagram of a varifocal lens for controlling perceived display distance in accordance with some embodiments.

FIG. 23 illustrates a diagram of a varifocal lens 2300 for controlling perceived display distance in accordance with some embodiments. The varifocal lens 2300 may implement or be implemented by aspects of the multi-focal lens 2200 as described with reference to FIG. 22. The varifocal lens 2300 may include a varifocal lens portion, having a region 2310 having a first optical power and a region 2320 having a second optical power different from the first optical power. An optical power of the varifocal lens 2300 can transition between the first optical power and the second optical power across a transition region including a corridor 2350, a blending region 2354, and a blending region 2356. The discussion above pertaining to the design and regions of varifocal lens portions is applicable to the varifocal lens 2300 in FIG. 23.

The varifocal lens 2300 can be designed deliberately so that a display light 2390 from a light engine passes through only region 2310. That is, the region 2310 of the varifocal lens 2300 can be shaped or positioned relative to an optical redirector, or an optical redirector can be positioned and oriented relative to the region 2310 of the varifocal lens 2300, such that an output eyebox of the optical redirector passes through the region 2310. The first optical power can be selected to focus the display light 2390 to produce a virtual display at a desired perceived distance, as is discussed in more detail with reference to FIGS. 24 and 25.

FIG. 22 illustrates the region 2210 as being positioned in a center of the lens portion 2200, and FIG. 23 illustrates the region 2310 as being positioned in a top-left area of the lens portion 2300. However, the region 2210 and the region 2310 could be positioned anywhere on a lens portion as appropriate, depending on a desired position of a display. The exemplary implementations illustrated in FIGS. 22 and 23 are particularly useful for providing control and customizability over the perceived distance of a virtual display.

Figure 24:
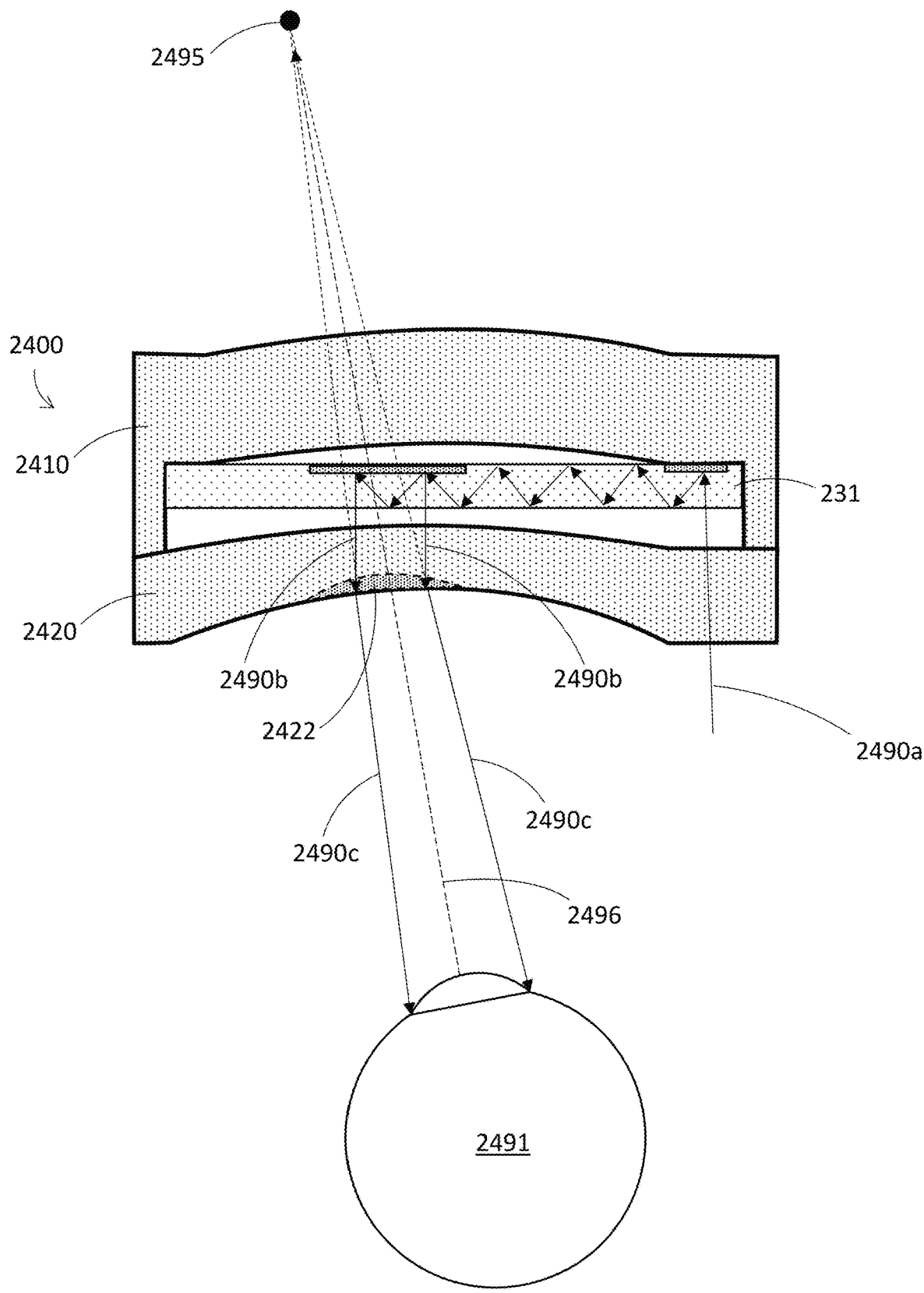
FIGS. 24 and 25 illustrates diagrams of lens assemblies for controlling perceived display distance in accordance with some embodiments.

FIG. 24 illustrates a diagram of a lens assembly 2400 for controlling perceived display distance in accordance with some embodiments. The lens assembly 2400 may include a world-side lens portion 2410 and an eye-side lens portion 2420. The lens assembly 2400 can include a light guide-based optical redirector 231, which receives a display light 2490a from a light engine, and redirects the display light 2490a towards an eye 2491 of a user as a display light 2490b. In the example of FIG. 24, the eye side lens portion 2420 can include a region 2422 through which a display light 2490b passes. The display light 2490b can impinge on a region 2422, pass therethrough, and exit region the 2422 as a display light 2490c. The display light 2490b from an optical redirector 231 can have infinite focal length (i.e., be parallel rays). The region 2422 can have a first optical power, such that the display light 2490c which has passed therethrough has a finite focal length. This can be used to redirect display light such that the user will perceive a virtual display at a certain distance; absent the region 2422, the display light 2490b which is not redirected will appear to a user as being focused at infinity.

In the example of FIG. 24, region 2422 has a negative optical power relative to the rest of eye-side lens portion 2420 to diverge display light 2490c towards eye 2491 of the user, resulting in a perceived display at a virtual position 2495. For negative optical power, the perceived virtual display distance (in meters) will be inversely proportional to the magnitude of the optical power. As an example, region 2422 could have an optical power of −0.5 diopters relative to the rest of eye-side lens portion 2420, which results in a perceived virtual display distance of 2 meters. As another example, region 2422 could have an optical power of −1 diopter relative to the rest of eye-side lens portion 2420, which results in a perceived display distance of 1 meter. As yet another example, region 2422 could have an optical power of −0.25 diopters relative to the rest of eye-side lens portion 2420, which results in a perceived virtual display distance of 4 meters. In summary, the optical power of region 2422 can be tuned to set the perceived virtual display distance to a desired value.

Optical power of region 2422 is set relative to optical power of the rest of eye-side lens portion, to set the perceived display distance relative to environmental perception of a user. As one example, for a perceived display distance of 2 meters, for a user requiring a prescription of 3 diopters, eye-side lens 2420 could have an optical power of 3 diopters, except for region 2422, which can have an optical power of 2.5 diopters (3 diopters plus −0.5 diopters). In this way, the display perceived by the user is perceived relative to the environmental light seen by the user, such that the −0.5 diopter difference from the user's prescription will move the perceived display to 2 meters in the context of environmental light seen by the user. As another example, for a perceived display distance of 2 meters, for a user requiring a prescription of −2 diopters, eye-side lens 2420 could have an optical power of −2 diopters, except for region 2422, which can have an optical power of −2.5 diopters (−2 diopters plus −0.5 diopters).

The region 2422 in FIG. 24 can be positioned along an axis 2496 which extends from eye 2491 of the user to virtual position 2495 (i.e., to a desired position of a virtual display). Although FIG. 24 illustrates a lens assembly having multiple lens portions and a light guide, in which the concepts discussed with reference to FIGS. 22 and 23 could be implemented, it is also possible to implement the concepts of FIGS. 22 and 23 in wearable display devices in which a single lens is between the optical redirector and an eye of the user.

Figure 25:
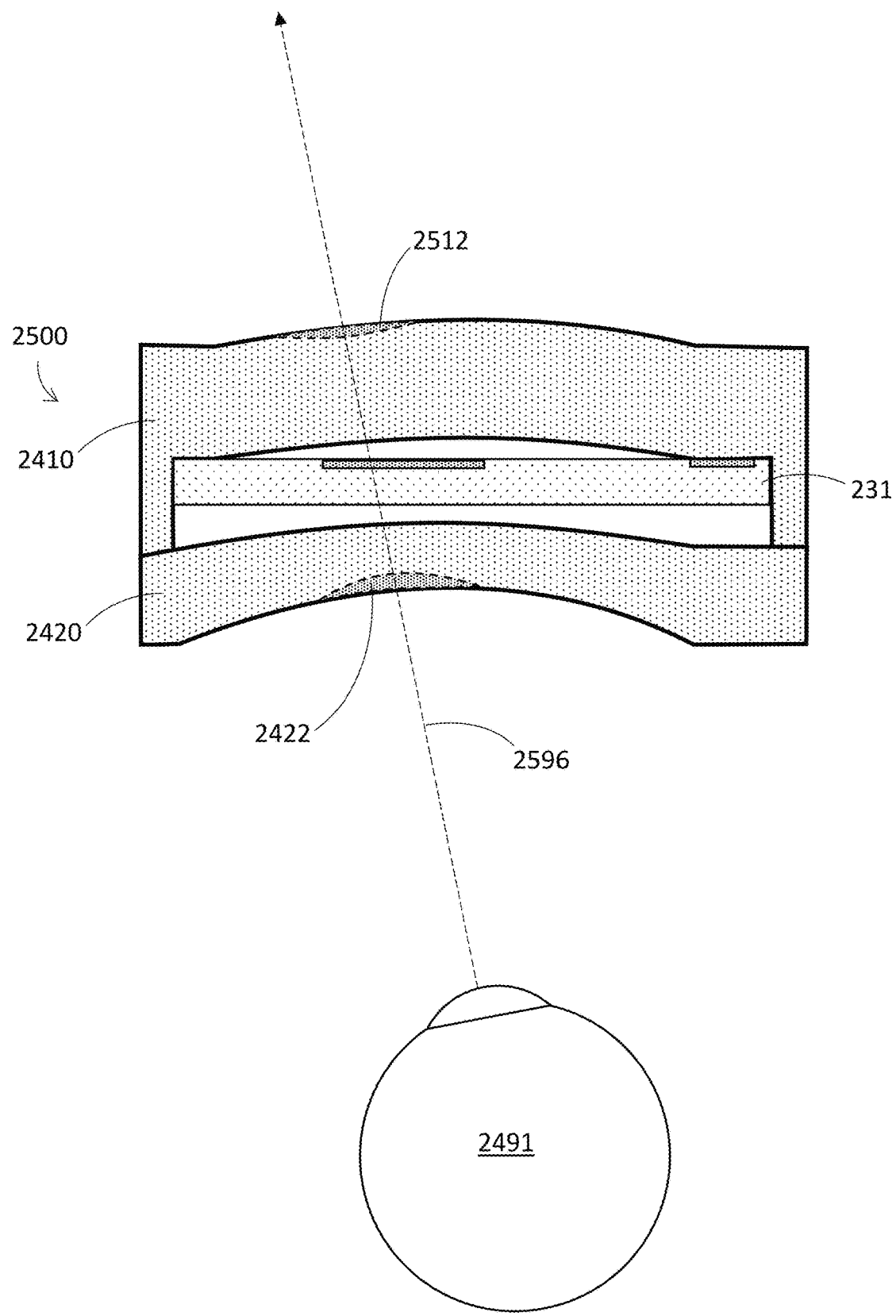

Providing a region having a controlled optical power on an eye-side lens portion can be helpful for controlling perceived display distance, but this region of optical power may cause aberrations or non-ideal performance for environmental light. In the example of FIG. 24, if the optical power of region 2422 is particularly different from the rest of eye-side lens portion 2420, this can cause region 2422 to apply undesired optical power to environmental light, making the wearable display devices less than ideal for non-display purposes. FIG. 25 illustrates an exemplary implementation for addressing this issue.

FIG. 25 illustrates a diagram of a lens assembly 2500 for controlling perceived display distance in accordance with some embodiments. The lens assembly 2500 may include world-side lens portion 2410 includes a region 2512 optically aligned with region 2422 on eye-side lens portion 2420. In this context, "optically aligned" means that region 2512 is positioned along an axis 2596 which extends from eye 2491 of the user through region 2422. Stated differently, region 2422, region 2512, and an output eyebox of optical redirector 231 can be aligned along axis 2596. Region 2512 can have an optical power to compensate for effects of the optical power of region 2422 on environmental light. In particular, a difference of optical power of region 2512 relative to the rest of world-side lens portion 2410 can be equal in magnitude and opposite in sign to a difference of optical power of region 2422 relative to the rest of eye-side lens portion 2420. For example, a difference obtained by subtracting the optical power of region 2422 from the optical power of the rest of lens portion 2420 can be of equal magnitude and opposite sign to a difference obtained by subtracting the optical power of region 2512 from the optical power of the rest of lens portion 2410. In this way, environmental light which passes through region 2422 towards eye 2491 of the user will have first passed through region 2512; the optical power of region 2512 will effectively cancel out the optical power of region 2422 with respect to environmental light which the user sees, and thus aberrations in environmental light can be reduced or eliminated. However, since display light travelling from optical redirector 231 towards eye 2491 does not pass-through region 2512, the optical power of region 2512 will not cancel out the optical power of region 2422 on display light. Consequently, the perceived display distance can still be controlled by selecting the optical power of region 2422, while maintaining desired optical performance characteristics of the lens assembly 2500 with respect to environmental light. Further, region 2512 could cover a larger area than region 2422, since the light which enters a user's pupil and impinges on the retina can generally be modelled by a conical shape which expands as distance increases from the eye.

In one exemplary implementation, for a user who requires no prescription for vision correction, region 2422 could have an optical power of −0.5 diopters so that a perceived virtual display distance is 2 meters, and region 2512 could have an optical power of 0.5 diopters, to produce a net optical power of 0 diopters on environmental light when a user is looking through region 2422 and region 2512. In another exemplary implementation, for a user who requires no prescription for vision correction, region 2422 could have an optical power of −1 diopters so that a perceived virtual display distance is 1 meter, and region 2512 could have an optical power of 1 diopter, to produce a net optical power of 0 diopters on environmental light when a user is looking through region 2422 and region 2512. In yet another exemplary implementation, for a user who requires no prescription for vision correction, region 2422 could have an optical power of −0.25 diopters so that a perceived virtual display distance is 4 meters, and region 2512 could have an optical power of 0.25 diopters, to produce a net optical power of 0 diopters on environmental light when a user is looking through region 2422 and region 2512. In the preceding examples where a user requires no prescription for vision correction, world-side lens portion 2410 could have an optical power of 0 outside of region 2512, and eye-side lens portion 2420 could have an optical power of 0 outside of region 2422, resulting in a net optical power of 0 being applied to environmental light viewed by a user outside of region 2422 and region 2512.

The examples described above with reference to FIGS. 22 through 25 are generally described in the context where the overall lens assembly is desired to have a plano effect; that is, no optical power. However, the same features could be implemented in cases where a non-plano effect is desired, such as if the user requires vision correcting lenses. In such cases, the optical powers described above to control the perceived display distance are relative to optical power imparted to the lens portions to correct vision of the user. As one scenario, with reference to FIG. 25, if a user requires a corrective optical power of 6 diopters, but a perceived display distance of 2 meters is desired, this could be achieved in multiple different ways, with some non-limiting exemplary ways discussed below.

In a first example, eye-side lens portion 2420 could have an optical power of zero outside of region 2422, and an optical power of −0.5 diopters in region 2422. World-side lens portion 2410 could have an optical power of 6 diopters outside of region 2512, and an optical power of 6.5 diopters within region 2512. In this way, when a user is looking through region 2422 and region 2512, they will experience an optical power of −0.5 diopters plus 6.5 diopters, which results in a net optical power of 6 diopters. When the user is looking outside of region 2422 and region 2512, they will experience an optical power of 0 plus 6 diopters, for a net optical power of 6 diopters. Thus, the desired optical power is achieved over the lens assembly.

In a second example, eye-side lens portion 2420 could have an optical power of 3 outside of region 2422, and an optical power of 2.5 diopters in region 2422. World-side lens portion 2410 could have an optical power of 3 diopters outside of region 2512, and an optical power of 3.5 diopters within region 2512. In this way, when a user is looking through region 2422 and region 2512, they will experience an optical power of 2.5 diopters plus 3.5 diopters, which results in a net optical power of 6 diopters. When the user is looking outside of region 2422 and region 2512, they will experience an optical power of 3 plus 3 diopters, for a net optical power of 6 diopters. Thus, the desired optical power is achieved over the lens assembly.

In a third example, eye-side lens portion 2420 could have an optical power of 6 outside of region 2422, and an optical power of 5.5 diopters in region 2422. World-side lens portion 2410 could have an optical power of 0 diopters outside of region 2512, and an optical power of 0.5 diopters within region 2512. In this way, when a user is looking through region 2422 and region 2512, they will experience an optical power of 5.5 diopters plus 0.5 diopters, which results in a net optical power of 6 diopters. When the user is looking outside of region 2422 and region 2512, they will experience an optical power of 6 plus 0 diopters, for a net optical power of 6 diopters. Thus, the desired optical power is achieved over the lens assembly. Any appropriate combination and distribution of optical powers could be implemented to achieve both the desired optical characteristics of the lens assembly as a whole, and the desired perceived virtual display distance.

FIGS. 11 through 21 detail implementations for preventing distortion of display light which passes through a multi-focal lens portion. FIGS. 26 and 27 illustrate alternate implementations, in which this issue can be avoided by positioning the optical redirector between a user's eye and a multi-focal lens portion, such that display light directed towards an eye of a user does not pass through a multi-focal lens portion.

Figure 26:
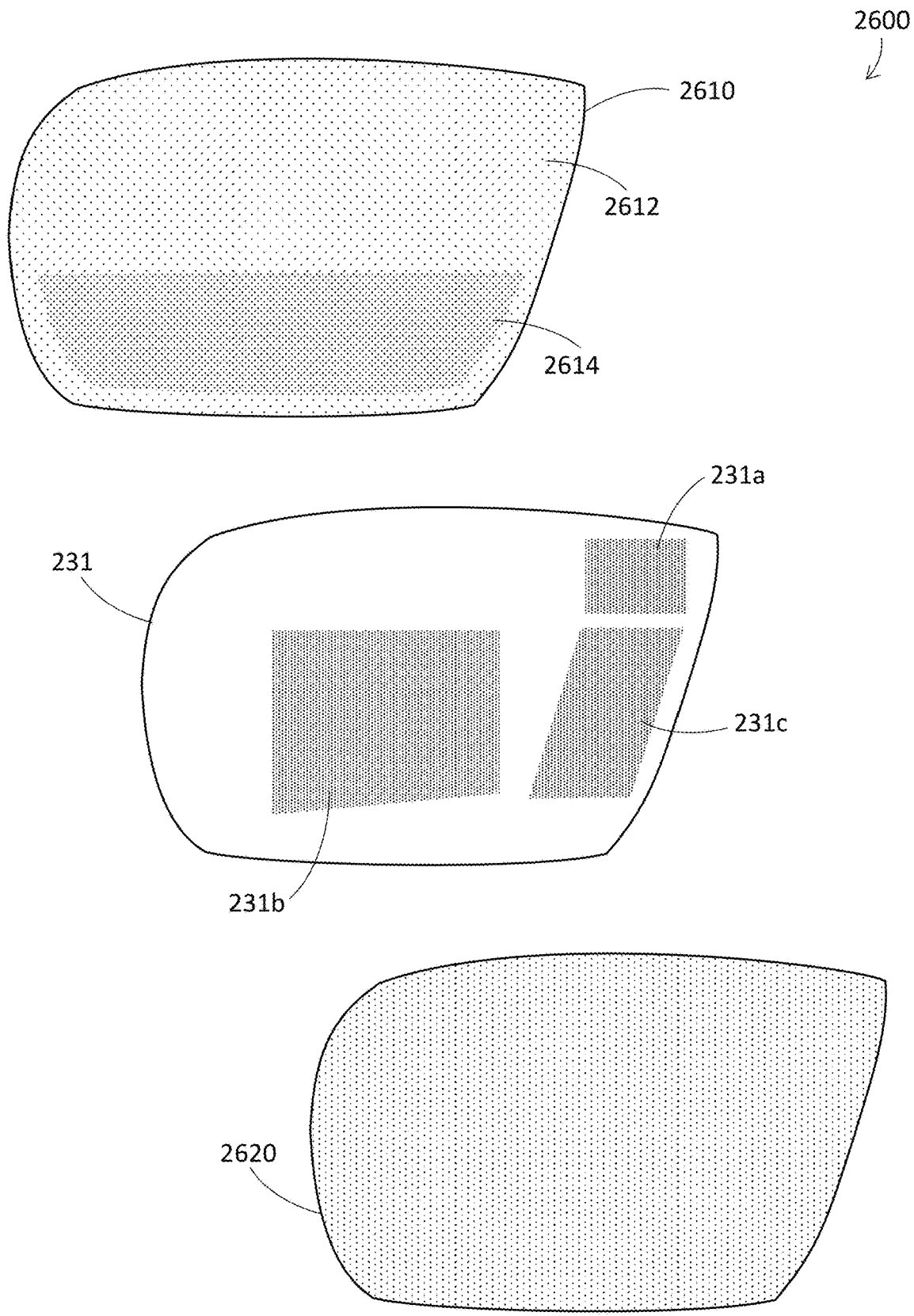
FIG. 26 illustrates a diagram of a lens assembly including a multi-focal lens in accordance with some embodiments.

FIG. 26 illustrates a diagram of a lens assembly 2600 including a multi-focal lens in accordance with some embodiments. The lens assembly 2600 may include a world-side lens portion 2610, an eye-side lens portion 2620, and an optical redirector 231, with optical redirector 231 positioned between a world-side lens portion 2610 and an eye-side lens portion 2620. The world-side lens portion 2610 can be a multi-focal lens portion. In the example shown in FIG. 26, the world-side lens portion 2610 is a bi-focal lens portion with a region 2612 having a first optical power and a region 2614 having a second optical power. The optical redirector 231 in FIG. 26 includes an incoupler 231a and outcoupler 231b similar to those described above. The optical redirector 231 may include an exit-pupil expander 231c. The display light from a light engine is received by the incoupler 231a and redirected to travel in a volume of the optical redirector 231 towards exit pupil expander 231c. The exit pupil expander 231c receives the display light from the incoupler 231a, and redirects at least a portion of display towards the outcoupler 231b as a plurality of spatially separated portions of display light. The outcoupler 231b receives the plurality of spatially separated portions of display light, and redirects at least some of the display light to exit the volume of the optical redirector 231 towards an eye of a user through the eye-side lens portion 2620.

The eye-side lens portion 2620 is a single-focal lens portion (i.e., eye-side lens portion 2620 has a single optical power), and thus there are no transition regions which can cause aberrations in display light which passes therethrough. Because the world-side lens portion 2610 is a multi-focal lens portion positioned opposite the optical redirector 231 from the eye-side lens portion 2620, transition regions in the world-side lens portion 2620 will not cause aberrations in display light which forms the display seen by the user. The world-side lens portion 2610 will still influence environmental light passing therethrough, and thus the lens assembly 2600 will function as a multi-focal lens for the purposes of environmental viewing.

Figure 27:
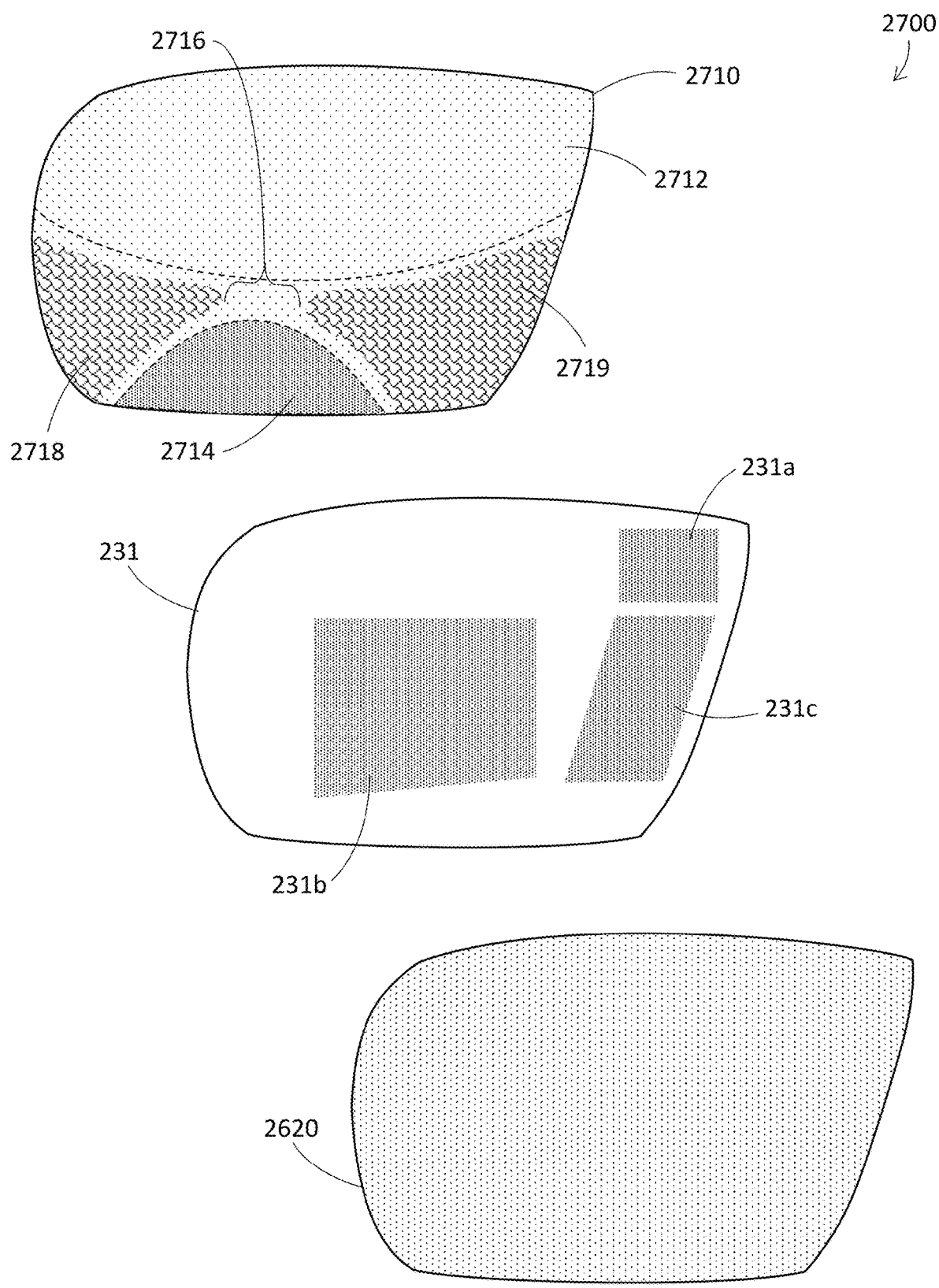
FIG. 27 illustrates a diagram of a lens assembly including a varifocal lens in accordance with some embodiments.

FIG. 27 illustrates a diagram of a lens assembly 2700 including a varifocal lens in accordance with some embodiments. The lens assembly 2700 may include a world-side lens portion 2710, an eye-side lens portion 2620, and an optical redirector 231, which can be assembled together in a stack such as those illustrated in FIGS. 5, 6, 7, 8, and 9, with optical redirector 231 positioned between world-side lens portion 2610 and eye-side lens portion 2620. Lens assembly 2700 is similar in at least some respects to lens assembly 2600 described with reference to FIG. 26. Unless context dictates otherwise, description of lens assembly 2600 and the components therein is applicable to lens assembly 2700. The world-side lens portion 2710 may be a varifocal lens portion. The world-side lens portion has a region 2712 having a first optical power and a region 2714 having a second optical power, separated by a transition region including a corridor 2716, a blending region 2718, and a blending region 2719. In some embodiments, because the world-side lens portion 2710 is a varifocal lens portion positioned opposite the optical redirector 231 from the eye-side lens portion 2620, transition regions in the world-side lens portion 2620 will not cause aberrations in display light which forms the display seen by the user. However, the world-side lens portion 2710 will still influence environmental light passing therethrough, and thus the lens assembly 2700 will function as a varifocal lens for the purposes of environmental viewing.

The lens portions described herein include regions having optical power, which can be achieved in a number of ways. For example, a difference in curvature between opposing surfaces of a lens portion can be adjusted to impart an optical power to the lens portion. As another example, a given surface of a lens portion can be formed according to a freeform function, to control thickness of the lens portion over different regions and to control curvature of the surface over different regions, to thereby impart different optical powers to different regions of a lens portion. Further, adjustments can be made to any appropriate surface of a lens portion. For example, one surface of a lens portion could be spherical, whereas an opposing surface could be a freeform surface having different curvatures over different regions. In this way, a single surface, or both opposing surfaces, could be adjusted to provide the desired optical power profile to a lens portion. As one example, a lens portion could have a first surface with a spherical profile with one continuous optical power thereacross, and a second surface opposite the first surface having an "add-power" region, in which the second surface is shaped to apply an optical power shift in the positive direction in the "add power region". In this example, the first surface could have optical power of zero, such that the second surface is responsible for all optical power in the lens portion. Alternatively, the first surface could have non-zero optical power, and the second surface could have zero optical power outside of the add-power region, such that the first surface is responsible for an overall optical power over the whole lens portion, and the second surface is responsible for changes to the optical power, such as for "add optical power" regions with more positive optical power for near-distance viewing.

Further, the desired optical characteristics of a lens could be spread out over multiple lens portions in a lens assembly. As one example, a first lens portion in a lens assembly could have a single optical power thereacross, whereas a second lens portion in the lens assembly could have regions of different optical powers.

As one example, with reference to FIG. 26, eye-side lens portion 2620 could have a single uniform non-zero optical power thereacross, whereas worlds-side lens portion 2610 could have an optical power of zero in region 2612 and a non-zero optical power in region 2614. In this way, the optical power of eye-side lens portion 2620 applies when the user is looking through region 2612 of world-side lens portion 2610, whereas the optical power of eye-side lens portion 2620 plus the optical power of region 2614 applies when the user is looking through region 2614 of world-side lens portion 2610. This could be useful to correct long-distance viewing through region 2612 of world-side lens portion 2610, and to correct near-distance viewing through region 2614 of world-side lens portion 2610. As a similar example, with reference to FIG. 27, eye-side lens portion 2620 could have a single uniform non-zero optical power thereacross, whereas world-side lens portion 2710 could have an optical power of zero in region 2712 and a non-zero optical power in region 2714. In this way, the optical power of eye-side lens portion 2620 applies when the user is looking through region 2712 of world-side lens portion 2710, whereas the optical power of eye-side lens portion 2620 plus the optical power of region 2714 applies when the user is looking through region 2714 of world-side lens portion 2710. This could be useful to correct long-distance viewing through region 2712 of world-side lens portion 2710, and to correct near-distance viewing through region 2714 of world-side lens portion 2710.

As another example, with reference to FIG. 26, eye-side lens portion 2620 could have zero optical power thereacross, whereas world-side lens portion 2610 could have a non-zero optical power in region 2612 and a different non-zero optical power in region 2614. In this way, the desired optical power characteristics are included in world-side lens portion 2610. As a similar example, with reference to FIG. 27, eye-side lens portion 2620 could zero optical power thereacross, whereas world-side lens portion 2710 could have a non-zero optical power in region 2712 and a different non-zero optical power in region 2714. In this way, the desired optical power characteristics are included in world-side lens portion 2710. As further examples, with reference to FIGS. 26 and 27, each of eye-side lens portion 2620, region 2612 of world-side lens portion 2610, region 2614 of world-side lens portion 2610, region 2712 of world-side lens portion 2710, and region 2714 of world-side lens portion 2710 could have some optical power, so as to produce desired net optical power characteristics for the lens assembly.

Advantageously, utilizing optical powers of multiple lens portions in a lens assembly to achieve desired optical characteristics can provide improved performance. With reference again to FIGS. 26 and 27, eye-side lens portion 2620 could have an optical power tuned to redirect display light to achieve a desired perceived virtual display distance, using similar principles to those discussed above with reference to FIGS. 24 and 25. For example, eye-side lens portion 2620 could have an optical power of −0.5 diopters, to achieve a perceived virtual display distance of two meters. However, the optical power of eye-side lens portion 2620 will also impact environmental light passing therethrough, such that if the optical power of eye-side lens portion 2620 does not match a prescription of the user, environmental light can be blurry or overfocused. To counteract this, an optical power of a world-side lens can be adjusted to balance the optical power of the eye-side lens. For example, if the user needs no prescription to correct their vision, but the eye-side lens has an optical power of −0.5 diopters, the world side lens can have an optical power of 0.5 diopters, so that no net optical power is applied by the lens assembly. As another example, if the user needs corrective optical power of 3 diopters, and the eye-side lens has an optical power of −0.5 diopters, the world-side lens portion can have a power of 3.5 diopters to provide a total optical power of 3.0 diopters. As yet another example, if the user needs corrective optical power of −1 diopter for long-distance viewing and an optical power of 2 diopters for close-range viewing (i.e., an add power of 3 diopters), and the eye-side lens has an optical power of −0.5 diopters, the world-side lens portion can have an optical power of −0.5 diopters in a long distance viewing region to provide a total optical power of −1 diopter for long-distance viewing, and the world-side lens portion can have an optical power of 2.5 diopters to provide a total optical power of 2 diopters for near-distance viewing.

Further, any of the surface profiles of the lens portions in a lens assembly can be controlled to provide a desired optical performance. With reference to FIG. 26, a world-side surface of world-side lens portion 2610 could be profiled to provide regions 2612 and 2614 having different optical powers, for example by forming the world-side surface of world-side lens portion 2610 as a freeform surface. Alternatively, with reference to FIG. 26, an eye-side surface of world-side lens portion 2610 could be profiled to provide regions 2612 and 2614 having different optical powers, for example by forming the eye-side surface of world-side lens portion 2610 as a freeform surface. Alternatively, both the eye-side surface and the world-side surface of world-side lens portion 2610 could be profiled to provide a portion of optical power for world-side lens portion 2610.

Similarly, with reference to FIG. 27, a world-side surface of world-side lens portion 2710 could be profiled to provide regions 2712 and 2714 having different optical powers, for example by forming the world-side surface of world-side lens portion 2710 as a freeform surface. Alternatively, with reference to FIG. 27, an eye-side surface of world-side lens portion 2710 could be profiled to provide regions 2712 and 2714 having different optical powers, for example by forming the eye-side surface of world-side lens portion 2710 as a freeform surface. Alternatively, both the eye-side surface and the world-side surface of world-side lens portion 2710 could be profiled to provide a portion of optical power for world-side lens portion 2710.

Similarly, for examples where an eye-side lens portion has optical power, either or both of the eye-side surface or the world-side surface of the eye-side lens portion could be profiled to provide optical power. When referring to a world-side surface or an eye-side surface of a given lens portion herein, world-side surface refers to a surface of the lens portion which is distal from an eye of the user, with respect to an eye-side surface which is proximal to an eye of the user by comparison.

Note that the above examples assume that optical power of the world-side lens portion has the same effect as optical power of the eye-side lens portion, such that a total optical power of the lens assembly is the sum of the optical power of the world-side lens portion and the eye-side lens portion. This is approximately true for thin lens assemblies, but there may be slight differences due to the eye-side lens portion being closer to the eye of the user. A formula for modelling total optical power through multiple lenses is:

$$\phi = \phi_1 + \phi_2 \phi - \phi_2 t$$

In the above formula, $\phi_1$ represents optical power of a first lens portion, $\phi_2$ represents optical power of a second lens portion, t represents space between the first and second lens portions, and $\phi$ represents total optical power of the first and second lens portions together. In view of the above, a non-zero space t between lens portions can result in total optical power $\phi$ not being the sum of optical power $\phi_1$ and optical power $\phi_2$. As one example, a non-zero space t between lens portions can result in total optical power $\phi$ not being zero even if optical power $\phi_1$ and optical power $\phi_2$ are of equal magnitude and opposite sign. The precise optical powers of first and second lens portions required to produce a desired optical power can be determined according to the above formula. In some cases, space t may be sufficiently small such that the effect of the term $\phi_1\phi_2 t$ is negligible, and the desired total optical power $\phi$ can be approximately achieved through a sum of optical power $\phi_1$ and optical power $\phi$.

In view of the above, throughout this disclosure balance of optical powers between a world-side lens portion and eye-side lens portion can be slightly offset, to account for space between lens portions. For example, even if a world-side lens portion is described herein as having an optical power "equal in magnitude and opposite in sign" to an optical power of an eye-side lens portion, in practice this can include the world-side lens having an optical power slightly different from an optical power of the eye-side lens portion, to compensate for the extra distance from the eye of the user. The magnitude of the difference can be proportional to the overall thickness of the lens assembly (i.e. the separation between lens portions).

Despite the above advantages of spreading desired optical power across multiple lens surfaces and/or multiple lens portions, this can be more complicated to manufacture. For example, if an optical power for correcting vision of a user is spread between a world-side lens and an eye-side lens of a lens assembly, this means that both the world-side lens portion and the eye-side lens portion must be custom-made (or at least selected from a large inventory of pre-made lens portions). This increases manufacturing time and costs, and complications inventory management. Consequently, it can be advantageous to implement all lens-portion customization into one lens portion, and even into a single surface of one lens portion. It is in this scenario where the features discussed with reference to FIGS. 11 through 21 are particularly advantageous, because these features enable accommodation of multi-focal lens prescriptions without necessitating customization of additional lens portions or lens surfaces.

In some implementations, one or more optical fiber(s) may be used to guide light signals along some of the paths illustrated herein.

The wearable heads-up displays described herein may include one or more sensor(s) (e.g., microphone, camera, thermometer, compass, altimeter, and/or others) for collecting data from the user's environment. For example, one or more camera(s) may be used to provide feedback to the processor of the wearable heads-up display and influence where on the display(s) any given image should be displayed.

The wearable heads-up displays described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, "at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A wearable display device comprising:
a light engine configured to output a display light;
a lens including a first region having a first optical power, a second region having a second optical power different from the first optical power, and a first transition region between the first region and the second region, wherein an optical power of the first transition region transitions between the first optical power and the second optical power; and an optical redirector positioned and oriented to receive the display light from the light engine and redirect display light towards a target area through a region of the lens outside of the first transition region such that the display light does not pass through the first transition region.

2. The wearable display device of claim 1, wherein the first transition region is shaped to be outside of an area of the lens through which the display light passes.

3. The wearable display device of claim 1, wherein the optical redirector is positioned and oriented to redirect the display light from the light engine through one of the first region of the lens or the second region of the lens.

4. The wearable display device of claim 3, wherein the second region of the lens is positioned near a bottom of the lens.

5. The wearable display device of claim 3, wherein the lens comprises a bifocal lens, the second optical power provides optical power add compared to the first optical power, and the first transition region is a boundary between the first region and the second region.

6. The wearable display device of claim 1, wherein the lens comprises a trifocal lens which further includes a third region having a third optical power and a second transition region between the first region and the third region, wherein an optical power of the second transition region transitions between the first optical power and the third optical power over the second transition region, the optical redirector positioned and oriented to redirect display light from the light engine through one of the first region of the lens, the second region of the lens, or the third region of the lens.

7. The wearable display device of claim 1, wherein the lens is a varifocal lens and the first transition region includes:
a corridor between the first region and the second region, the corridor having an optical power ranging between the first optical power at the first region and the second optical power at the second region;
a first blending region adjacent the first region, the second region, and the corridor; and
a second blending region adjacent the first region, the second region, and the corridor opposite the first blending region, wherein the optical redirector is positioned and oriented to redirect display light from the light engine towards the target area through a region of the lens outside of the corridor, the first blending region, and the second blending region.

8. The wearable display device of claim 7, wherein the optical redirector is positioned and oriented to redirect display light from the light engine through the first region of the lens.

9. The wearable display device of claim 7, wherein the optical redirector is positioned and oriented to redirect display light from the light engine through the second region of the lens.

10. The wearable display device of claim 7, wherein the second optical power provides optical power add compared to the first optical power.

11. The wearable display device of claim 7, wherein the first blending region, the second blending region, and the corridor are shaped to be outside of an area of the lens through which display light passes.

12. The wearable display device of claim 1, wherein the second region of the lens is positioned along an axis that extends from the target area to a desired position of a display in a field of view of a user, and the optical redirector is positioned and oriented to redirect display light from the light engine through the second region of the lens.

13. The wearable display device of claim 1, wherein the lens comprises an eye-side lens portion and a world-side lens portion, and wherein the optical redirector is sandwiched in between the eye-side lens portion and the world-side lens portion.

14. The wearable display device of claim 13, wherein the optical redirector comprises a light guide, the light guide including an incoupler to receive display light from the light engine and redirect the display light to travel within a volume of the light guide, the light guide further including an outcoupler to receive display light traveling in the volume of the light guide and redirect the display light traveling in the volume of the light guide to exit the volume of the light guide towards the eye-side lens portion.

15. The wearable display device of claim 13, wherein the first region and the second region are regions of the eye-side lens portion.

16. The wearable display device of claim 15, wherein:
the world-side lens portion includes a third region positioned along an axis that extends from the target area, through the second region, to a desired position of a display in a field of view of a user;
the world-side lens portion includes a fourth region outside of the third region; and
a difference between an optical power of the third region and an optical power of the fourth region compensates for a difference between the first optical power and the second optical power.

17. A lens assembly comprising:
a first lens portion, the first lens portion including a first region having a first optical power, a second region having a second optical power different from the first optical power, and a transition region between the first region and the second region, wherein an optical power of the transition region transitions between the first optical power and the second optical power over the transition region;
a second lens portion; and
a light guide positioned between the first lens portion and the second lens portion, the light guide having an output eyebox positioned outside of the transition region such that the output eyebox does not pass through the transition region.

18. The lens assembly of claim 17, wherein the transition region is shaped to be outside of the output eyebox of the light guide.

19. The lens assembly of claim 17, wherein the light guide has an output eyebox that passes through one of the first region of the first lens portion or the second region of the first lens portion.

20. The lens assembly of claim 19, wherein the second optical power provides an optical power add compared to the first optical power, and the transition region is a boundary between the first region and the second region.

21. The lens assembly of claim 17, wherein the first lens portion is a varifocal lens and the transition region is a corridor between the first region and the second region, the corridor having an optical power ranging between the first optical power at the first region and the second optical power at the second region, the first lens portion further comprising:
a first blending region adjacent the first region, the second region, and the corridor; and a second blending region adjacent the first region, the second region, and the corridor opposite the first blending region, wherein the output eyebox of the light guide is positioned outside of the corridor, the first blending region, and the second blending region.

22. The lens assembly of claim 21, wherein the output eyebox of the light guide passes through one of the first region or the second region of the first lens portion.

23. The lens assembly of claim 21, wherein the second optical power provides an optical power add compared to the first optical power.

24. The lens assembly of claim 21, wherein the first blending region, the second blending region, and the corridor are shaped to be outside of the output eyebox of the light guide.

25. The lens assembly of claim 17, wherein:
the second lens portion includes a third region;
the second lens portion includes a fourth region outside of the third region and having a different optical power from the third region;
a difference between an optical power of the third region and an optical power of the fourth region compensates for a difference between the first optical power and the second optical power; and
the second region of the first lens portion, the third region of the second lens portion, and the output eyebox of the light guide are aligned on an axis.

26. A wearable display device comprising:
a light engine carried by a support structure, the light engine to output display light;
an eye-side lens portion carried by the support structure to be positioned proximal to an eye of a user when the support structure is worn on a head of the user;
a world-side lens portion carried by the support structure to be positioned distal from the eye of the user when the support structure is worn on the head of the user, the world-side lens portion including a first region having a first optical power, a second region having a second optical power different from the first optical power, and a transition region between the first region and the second region, wherein an optical power of the transition region transitions between the first optical power and the second optical power over the transition region; and
an optical redirector positioned on the support structure, the optical redirector to receive display light from the light engine and redirect display light towards the eye of the user through the eye-side lens portion and outside of the transition region of the world-side lens portion such that the display light does not pass through the transition region when the support structure is worn on the head of the user.

27. The wearable display device of claim 26, wherein the optical redirector comprises a light guide, the light guide including an incoupler to receive display light from the light engine and redirect the display light to travel within a volume of the light guide, the light guide further including an outcoupler to receive display light travelling in the volume of the light guide and redirect the display light traveling in the volume of the light guide to exit the volume of the light guide towards the eye-side lens portion.

28. The wearable display device of claim 26, wherein the eye-side lens portion has a uniform non-zero optical power, the first optical power of the world-side lens portion is zero, and the second optical power of the world-side lens portion is non-zero.

29. A method at a wearable display device, the method comprising:
outputting, by a light engine associated with the wearable display device, a display light; and
receiving, by an optical redirector associated with the wearable display device, the display light from the light engine and redirecting the display light towards a target area through a region of a lens outside of a first transition region such that the display light does not pass through the first transition region, wherein the lens includes a first region having a first optical power, a second region having a second optical power different from the first optical power, and the first transition region between the first region and the second region, wherein an optical power of the first transition region transitions between the first optical power and the second optical power.

30. The method of claim 29, the first transition region is shaped to be outside of an area of the lens through which the display light passes.

* * * * *